(12) United States Patent
Feigel

(10) Patent No.: US 10,906,513 B2
(45) Date of Patent: Feb. 2, 2021

(54) ELECTRIC BRAKE SYSTEM

(71) Applicant: MANDO CORPORATION, Gyeonggi-do (KR)

(72) Inventor: Hans Joerg Feigel, Seoul (KR)

(73) Assignee: MANDO CORPORATION, Gyeonggi-do (KR)

( * ) Notice: Subject to any disclaimer, the term of this patent is extended or adjusted under 35 U.S.C. 154(b) by 12 days.

(21) Appl. No.: 15/981,895

(22) Filed: May 17, 2018

(65) Prior Publication Data

US 2018/0334148 A1   Nov. 22, 2018

(30) Foreign Application Priority Data

May 17, 2017 (KR) .......................... 10-2017-0061063

(51) Int. Cl.
*B60T 7/04* (2006.01)
*B60T 13/74* (2006.01)
(Continued)

(52) U.S. Cl.
CPC .............. *B60T 7/042* (2013.01); *B60T 8/326* (2013.01); *B60T 8/4081* (2013.01);
(Continued)

(58) Field of Classification Search
CPC ........ B60T 7/042; B60T 8/326; B60T 8/4081; B60T 13/166; B60T 13/662;
(Continued)

(56) References Cited

U.S. PATENT DOCUMENTS 9,738,263 B2 *   8/2017   Jung ..................... B60T 13/745
9,834,189 B2 * 12/2017   Jung ..................... B60T 13/686
(Continued)

FOREIGN PATENT DOCUMENTS

CN   1994793    7/2007
CN   104144831  11/2014
(Continued)

OTHER PUBLICATIONS

Office Action dated Oct. 9, 2019 for Chinese Patent Application No. 201810544863.3 and its English machine translation by Google Translate.

*Primary Examiner* — Thomas W Irvin
(74) *Attorney, Agent, or Firm* — Ladas & Parry, LLP

(57) ABSTRACT

Disclosed herein is an electronic brake system. The electric brake system includes a pedal operator connected to a brake pedal and configured to transmit a braking intention to an electronic control unit; a reservoir configured to store a working fluid; a pressure supplier provided with a driver providing a power, and configured to generate a hydraulic pressure of a plurality of wheel brakes; and a braking pressure regulator configured to regulate a hydraulic pressure, which is generated by the pressure supplier and transmitted to the wheel brake, wherein the braking pressure regulator includes a first hydraulic circuit hydraulically connected to two wheel brakes and a second hydraulic circuit hydraulically connected to the other two wheel brakes, wherein the first hydraulic circuit and the second hydraulic circuit are provided with a plurality of inlet lines connecting the pressure supplier to each of the wheel brake, and a plurality of outlet lines connecting each of the wheel brake to the reservoir or connecting each of the wheel brake to the pedal operator, wherein the first hydraulic circuit and the second hydraulic circuit are hydraulically separated from each other to regulate a hydraulic pressure, which is transmitted to the wheel brake by the other hydraulic circuit when any one hydraulic circuit operates abnormally.

22 Claims, 18 Drawing Sheets

(51) Int. Cl.
*B60T 8/40* (2006.01)
*B60T 13/66* (2006.01)
*B60T 13/68* (2006.01)
*B60T 13/16* (2006.01)
*B60T 8/32* (2006.01)
*B60T 8/36* (2006.01)

(52) U.S. Cl.
CPC .......... *B60T 13/166* (2013.01); *B60T 13/662* (2013.01); *B60T 13/686* (2013.01); *B60T 13/745* (2013.01); *B60T 8/321* (2013.01); *B60T 8/3645* (2013.01); *B60T 8/4018* (2013.01); *B60T 2270/404* (2013.01)

(58) Field of Classification Search
CPC ...... B60T 13/686; B60T 13/745; B60T 8/321; B60T 8/3645; B60T 8/4018; B60T 2270/404
See application file for complete search history.

(56) References Cited

U.S. PATENT DOCUMENTS

| | | | |
|---|---|---|---|
| 10,040,438 B2* | 8/2018 | Lim | B60T 8/4081 |
| 10,071,717 B2* | 9/2018 | Kim | B60T 13/745 |
| 10,077,036 B2* | 9/2018 | Kim | B60T 13/662 |
| 2016/0347298 A1* | 12/2016 | Jung | B60T 13/745 |
| 2016/0375886 A1* | 12/2016 | Jung | B60T 13/686 303/15 |
| 2017/0106843 A1* | 4/2017 | Jeong | B60T 8/90 |
| 2017/0144642 A1* | 5/2017 | Kim | B60T 7/042 |
| 2017/0158180 A1* | 6/2017 | Kim | B60T 13/745 |
| 2017/0210369 A1* | 7/2017 | Lim | B60T 7/042 |
| 2018/0050670 A1* | 2/2018 | Feigel | B60T 7/042 |
| 2018/0111593 A1* | 4/2018 | Kim | B60T 8/4081 |
| 2019/0092300 A1* | 3/2019 | Jeong | B60T 8/17 |
| 2019/0092301 A1* | 3/2019 | Jeong | B60T 8/17 |
| 2019/0100183 A1* | 4/2019 | Jung | B60T 13/58 |

FOREIGN PATENT DOCUMENTS

| | | |
|---|---|---|
| CN | 105473396 | 4/2016 |
| CN | 105691372 | 6/2016 |
| CN | 105745126 | 7/2016 |
| CN | 107757589 | 3/2018 |
| EP | 2 520 473 | 11/2012 |
| JP | 2000-185641 | 7/2000 |

\* cited by examiner

ELECTRIC BRAKE SYSTEM

CROSS-REFERENCE TO RELATED APPLICATION(S)

This application is based on and claims priority under 35 U.S.C. § 119 to Korean Patent Application No. 10-2017-0061063, filed on May 17, 2017, in the Korean Intellectual Property Office, the disclosure of which is incorporated by reference herein in its entirety.

BACKGROUND

1. Field

The disclosure relates to an electric brake system, and more particularly, to an electric brake system configured to generate a braking force using an electrical signal corresponding to a pedal displacement.

2. Description of Related Art

A vehicle is essentially equipped with a brake system for braking. Recently, various types of systems have been proposed for obtaining a more powerful and stable braking force.

Examples of the brake system include an anti-lock brake system (ABS) that prevents slippage of the wheel during braking, a brake traction control system (BTCS) that prevents slippage of driving wheels during sudden unintended acceleration or sudden acceleration, and an electronic stability control system (ESC) that stably maintains the running state of the vehicle by controlling the brake hydraulic pressure by combining an anti-lock brake system with traction control.

Generally, an electric brake system includes an actuator that receives an electrical signal corresponding to a driver's braking intention from a pedal displacement sensor configured to detect a displacement of the pedal and supplies pressure to a wheel cylinder when the driver presses the pedal.

The electric brake system equipped with such an actuator is disclosed in European Patent EP 2 520 473. According to the disclosed document, the actuator is configured to generate a braking pressure by operating a motor according to a pedal force of a pedal, wherein the braking pressure is generated by pressing a piston by converting a torque of the motor into a linear motion.

RELATED ART DOCUMENT

Patent Document

EP 2 520 473 A1 (Honda Motor Co., Ltd.) Nov. 7, 2012.

SUMMARY

Therefore, it is an aspect of the present disclosure to provide an electric brake system capable of generating a braking pressure using an actuator operated in a double action manner.

It is another aspect of the present disclosure to provide an electric brake system capable of coping with an abnormal operation situation of an actuator.

Additional aspects of the present disclosure will be set forth in part in the description which follows and, in part, will be obvious from the description, or may be learned by practice of the present disclosure.

In accordance with an aspect of the disclosure, an electric brake system includes a pedal operator connected to a brake pedal and configured to transmit a braking intention to an electronic control unit; a reservoir configured to store a working fluid; a pressure supplier provided with a driver providing a power, and configured to generate a hydraulic pressure of a plurality of wheel brakes; and a braking pressure regulator configured to regulate a hydraulic pressure, which is generated by the pressure supplier and transmitted to the wheel brake, wherein the braking pressure regulator includes a first hydraulic circuit hydraulically connected to two wheel brakes and a second hydraulic circuit hydraulically connected to the other two wheel brakes, wherein the first hydraulic circuit and the second hydraulic circuit are provided with a plurality of inlet lines connecting the pressure supplier to each of the wheel brake, and a plurality of outlet lines connecting each of the wheel brake to the reservoir or connecting each of the wheel brake to the pedal operator, wherein the first hydraulic circuit and the second hydraulic circuit are hydraulically separated from each other to regulate a hydraulic pressure, which is transmitted to the wheel brake by the other hydraulic circuit when any one hydraulic circuit operates abnormally.

The plurality of inlet lines may include a first inlet line provided in the first hydraulic circuit and provided with a first inlet valve, a second inlet line provided in the first hydraulic circuit and provided with a second inlet valve, a third inlet line provided in the second hydraulic circuit and provided with a third inlet valve, and a fourth inlet line provided in the second hydraulic circuit and provided with a fourth inlet valve, and the plurality of outlet lines may include a first outlet line provided in the first hydraulic circuit and provided with a first outlet valve, a second outlet line provided in the first hydraulic circuit and provided with a second outlet valve, a third outlet line provided in the second hydraulic circuit and provided with a third outlet valve, and a fourth outlet line provided in the second hydraulic circuit and provided with a fourth outlet valve, wherein the first to fourth inlet valves and the first to fourth outlet valves may be an analog normally open valve.

The pressure supplier may include a first piston operated by receiving power, and a pump chamber variable in volume according to a displacement of the first piston, wherein each of the first to fourth inlet lines may further include a corresponding one of first to fourth check valves provided between the pump chamber and a corresponding one of the inlet valve, and configured to allow only one-way flow from the pump chamber to the inlet valve.

The first to fourth inlet valves may be connected to two different power nets so that, when any one power net malfunctions, the first to fourth inlet valves are operated by the other power net.

The first to fourth outlet valves may be connected to two different power nets so that, when any one power net malfunctions, the first to fourth inlet valves are operated by the other power net.

An electrical performance of the first to fourth inlet valves may be controlled independent of an electrical performance of the first to fourth outlet valve so as to prevent simultaneous closing caused by malfunctions.

The pump chamber may include a first pump chamber disposed in front of the first piston and a second pump chamber disposed behind the first piston, wherein the pump chamber may further include a first pump reservoir line configured to connect the first pump chamber to the reservoir and provided with a check valve allowing only one-way flow from the reservoir to the first pump chamber, and a second pump reservoir line configured to connect the second pump chamber to the reservoir and provided with a check valve allowing only one-way flow from the reservoir to the second pump chamber.

The electronic control unit may include a first electronic control unit connected to the first power net and a second electronic control unit connected to the second power net configured to operate selectively or together with the first power net.

The pressure supplier may be operated by the second electronic control unit when the first electronic control unit operates abnormally or by the first electronic control unit when the second electronic control unit operates abnormally.

The electric brake system may further include a pedal displacement sensor configured to detect a displacement of the brake pedal, a circuit hydraulic pressure sensor configured to detect a hydraulic pressure of the first hydraulic circuit or the second hydraulic circuit; and a driving displacement sensor configured to detect a rotation amount of the driver, wherein the pedal displacement sensor, the hydraulic pressure sensor, and the driving displacement sensor may include a main sensor and an auxiliary sensor, respectively, wherein the auxiliary sensor may be a redundancy sensor configured to be operated when the main sensor operates abnormally.

The pedal operator may include a second piston connected the brake pedal, an elastic member configured to provide a reaction force corresponding a pedal force of the brake pedal, and a pedal displacement sensor configured to measure a user's braking intention, wherein the pedal operator may be hydraulically separated from the braking pressure regulator.

The electric brake system may further include a third pump reservoir line configured to connect the first pump chamber to the reservoir and provided with a check valve allowing only one-way flow from the first pump chamber to the reservoir, and a first dump valve; and a fourth pump reservoir line configured to connect the second pump chamber to the reservoir and provided with a check valve allowing only one-way flow from the second pump chamber to the reservoir, and a second dump valve.

The pedal operator may include a cylinder unit provided with a second piston connected to the brake pedal; and a simulator unit hydraulically connected to the cylinder unit to provide a reaction force corresponding to a pedal force of the brake pedal, wherein the cylinder unit may include a cylinder chamber variable in volume by the second piston and a pressure chamber variable in volume by a pressing member.

The brake pedal and the second piston may be connected to each other through an input rod, and the pressing member may be movable forward and backward by a locking protrusion provided on the input rod.

The electric brake system may further include a first reservoir line configured to connect the reservoir, the pressure chamber and the simulator unit, wherein the first reservoir line may include a first reservoir valve, and a check valve provided in parallel with the first reservoir valve and configured to allow only one way flow from the reservoir to the pressure chamber or only one way flow from the reservoir to the simulator unit.

The electric brake system may further include a second reservoir line and a third reservoir line configured to connect the reservoir to the cylinder chamber, wherein the second reservoir line may be provided with a normally closed second reservoir valve, and the third reservoir line may be provided with a check valve configured to allow only one way flow from the reservoir to the cylinder chamber.

The pressure supplier may include a first piston operated by receiving power; and a pump chamber variable in volume by a displacement of first piston, wherein the pump chamber may include a first pump chamber disposed in front of the first piston and a second pump chamber disposed behind the first piston, wherein the pump chamber may further include a first pump reservoir line configured to connect the first pump chamber to the reservoir and provided with a check valve allowing only one-way flow from the reservoir to the first pump chamber; a second pump reservoir line configured to connect the second pump chamber to the reservoir and provided with a check valve allowing only one-way flow from the reservoir to the second pump chamber; a third pump reservoir line configured to connect the first pump chamber to the reservoir and provided with a check valve allowing only one-way flow from the first pump chamber to the reservoir and a first dump valve; and a fourth pump reservoir line configured to connect the second pump chamber to the reservoir and provided with a check valve allowing only one-way flow from the second pump chamber to the reservoir and a second dump valve.

The first and second outlet lines may be connected to the cylinder chamber by joining from each of the wheel brake, and provided with a check valve configured to allow only one-way flow from each of the wheel brake to the cylinder chamber.

The third and fourth outlet lines may be connected to the cylinder chamber by joining from the wheel brake, and provided with a check valve configured to allow only one-way flow from the wheel brake to the cylinder chamber.

The pressure supplier may include a first piston operated by receiving power; and a pump chamber variable in volume by a displacement of first piston, wherein the pump chamber may include a first pump chamber disposed in front of the first piston and a second pump chamber disposed behind the first piston, wherein the pump chamber may further include a first pump reservoir line configured to connect the first pump chamber to the reservoir and provided with a check valve allowing only one-way flow from the reservoir to the first pump chamber; a second pump reservoir line configured to connect the second pump chamber to the reservoir and provided with a check valve allowing only one-way flow from the reservoir to the second pump chamber; a third pump reservoir line configured to connect the first pump chamber to the reservoir and provided with a check valve allowing only one-way flow from the first pump chamber to the reservoir; a fourth pump reservoir line configured to connect the second pump chamber to the reservoir and provided with a check valve allowing only one-way flow from the second pump chamber to the reservoir; and a fifth pump reservoir line connected to the reservoir after the third pump reservoir line and the fourth pump reservoir line join, and provided with a dump valve configured to regulate two-way flow.

The cylinder unit may further include a third piston configured to divide the cylinder chamber into a first cylinder chamber and a second cylinder chamber, wherein the second reservoir line may connect the reservoir to the first cylinder chamber; and the third reservoir line may connect the reservoir to the second cylinder chamber.

The electric brake system may further include a first cylinder line configured to connect the first cylinder chamber to the first hydraulic circuit; and a second cylinder line configured to connect the second cylinder chamber to the second hydraulic circuit, wherein the first cylinder line may be connected to the first and second inlet lines and provided with a check valve allowing only one-way flow from the first cylinder chamber to the first hydraulic circuit; and the second cylinder line may be connected to the third and fourth inlet lines and provided with a check valve allowing only one-way flow from the second cylinder chamber to the second hydraulic circuit.

The third and fourth outlet lines may be connected to the cylinder chamber by joining from each of the wheel brake and provided with a normally open cylinder valve.

The pressure supplier may include a first piston operated by receiving power; and a pump chamber variable in volume by a displacement of first piston, wherein the pump chamber may include a first pump chamber disposed in front of the first piston and a second pump chamber disposed behind the first piston, wherein the pump chamber may include a first inlet line connecting the first pump chamber to the first hydraulic circuit, a second inlet line connecting the second pump chamber to the second hydraulic circuit, a third inlet line connecting the second pump chamber to the first hydraulic circuit, and a fourth inlet line connecting the first pump chamber to the second hydraulic circuit, wherein the pump chamber may further include a first connection line configured to connect the first inlet line to the third inlet line and provided with a check valve allowing only one-way flow from the third inlet line to the first inlet line, and a normally closed first control valve; a second connection line configured to connect the fourth inlet line to the first connection line and provided with a check valve allowing only one-way flow from the fourth inlet line to the first connection line; and a third connection line provided in parallel with the second inlet line and provided with a normally closed second control valve.

BRIEF DESCRIPTION OF THE DRAWINGS

These and/or other aspects of the disclosure will become apparent and more readily appreciated from the following description of embodiments, taken in conjunction with the accompanying drawings of which.

DETAILED DESCRIPTION

The present disclosure will now be described more fully with reference to the accompanying drawings, in which embodiments of the disclosure are shown. Embodiments are provided so that this disclosure will be thorough and complete, and will fully convey the concept of the disclosure to those skilled in the art. In the description of the present disclosure, if it is determined that a detailed description of commonly-used technologies or structures related to the embodiments of the present disclosure may unnecessarily obscure the subject matter of the disclosure, the detailed description may be omitted and parts of the elements may be exaggerated in order to facilitate understanding.

Figure 1:
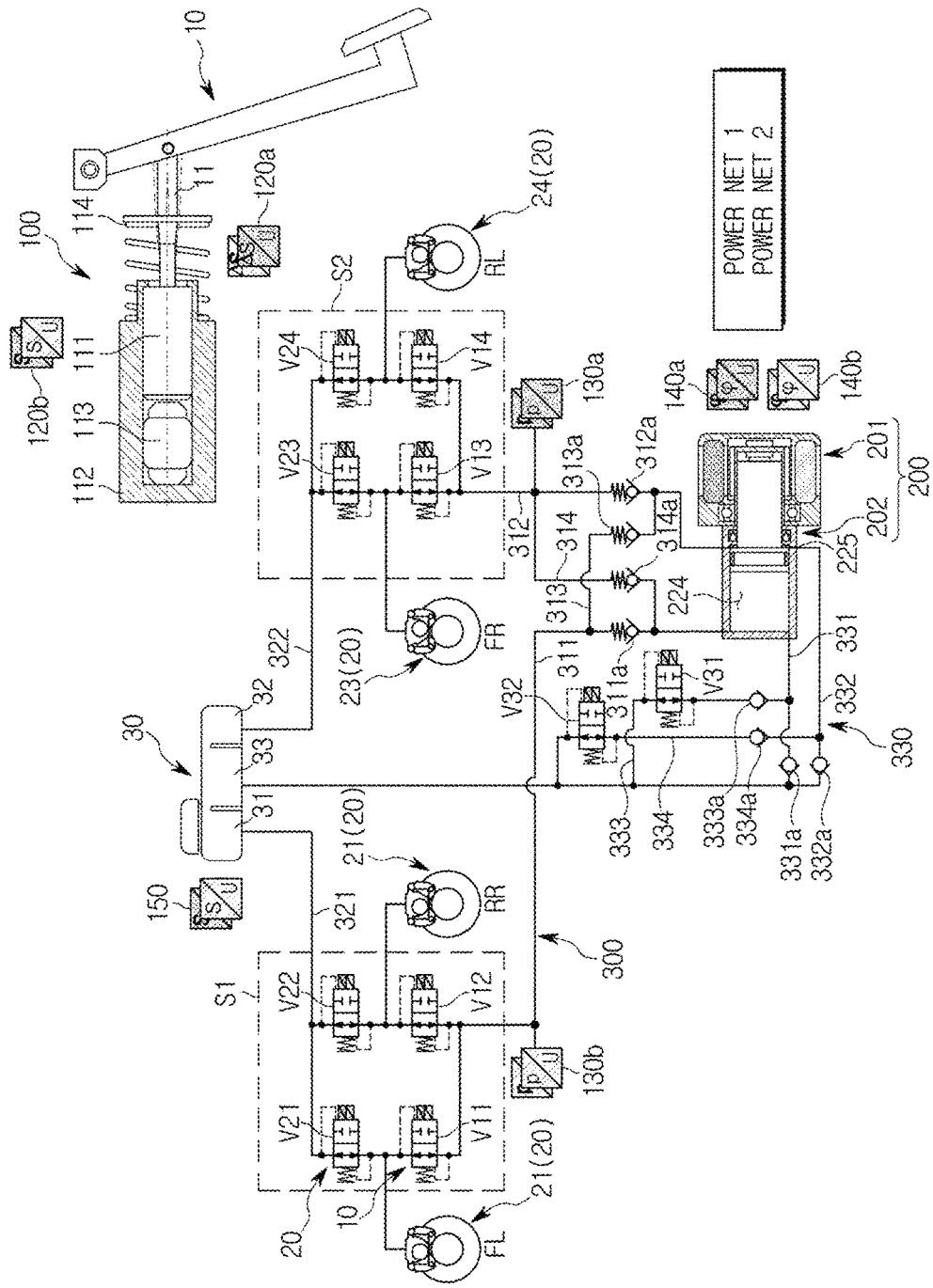
FIG. 1 is a view illustrating an electric brake system according to a first embodiment.
Figure 2:
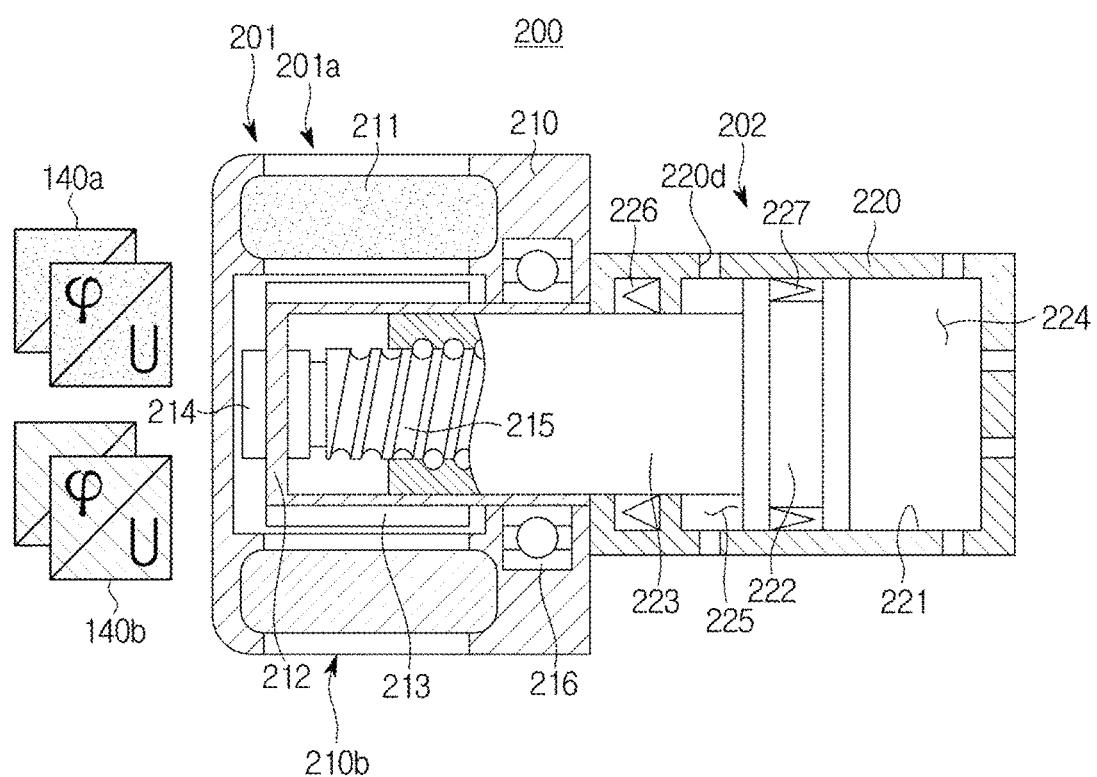
FIG. 2 is a view illustrating a pressure supplier according to the first embodiment.

FIG. 1 is a view illustrating an electric brake system according to a first embodiment, and FIG. 2 is a view illustrating a pressure supplier 200 according to the first embodiment. Referring to FIGS. 1 and 2, an electric brake system according to the first embodiment includes a pedal operator 100 transmitting a braking intention to an electronic control unit (ECU), a reservoir 30 storing a working fluid, and a braking pressure regulator 300 being operated by a pressure supplier 200 hydraulically connected to the a wheel brake. The braking pressure regulator 300 connects the pressure supplier 200 and the wheel brake via an inlet valve V10. The braking pressure regulator 300 includes first and second hydraulic circuits S1 and S2 directly or indirectly connecting the wheel brake to the reservoir 30 by using an outlet valve V20, wherein the first and second hydraulic circuits S1 and S2 are configured to operate independent of each other in the hydraulic manner and thus even when any one of the first and second hydraulic circuits S1 and S2 malfunctions, the other thereof operates normally.

The wheel brake 20 may include a caliper pressurized by the working fluid and a wheel braked by the caliper. The wheel brake unit 20 is pressurized by the working fluid that is transmitted to the wheel brake unit 20, thereby generating a braking force to the vehicle by braking the wheel. The reservoir 30 is a device configured to store the working fluid therein and configured to supply the working fluid to the brake system. The reservoir 30 may correspond to a storage container having an inlet provided in the upper portion to allow the working fluid to be additionally supplied from the outside. The wheel brake 20 may include first to fourth wheel brakes 21, 22, 23 and 24, wherein the wheel brake 20 may be any one of FL, FR, RL and RR provided on the right and left sides of the front and rear wheels of the vehicle.

The reservoir 30 is a device configured to store the working fluid therein and configured to supply the working fluid to the brake system. The reservoir 30 may correspond to a storage container having an inlet provided in the upper portion to allow the working fluid to be additionally supplied from the outside. A reservoir displacement sensor 150 having a main sensor connected to a first power net and a second sensor connected to a second power net may be mounted to the reservoir 30, wherein the second sensor may be a redundancy sensor.

The reservoir 30 may be provided with a first reservoir chamber 31 and a second reservoir chamber 32 respectively connected to the pair of hydraulic circuits S1 and S2, and a third reservoir chamber 33 disposed between the first reservoir chamber 31 and the second reservoir chamber 32, wherein the third reservoir chamber 33 may be connected to pump chambers 224 and 225 of the pressure supplier 200.

The pedal operator 100 may provide a reaction force according to the pedal force applied to the pedal 10 by the user. In addition, the pedal operator 100 may provide a reaction force corresponding to a force of the user for releasing the pedal force applied to the pedal 10. Accordingly, since the pedal operator 100 provides a reaction force configured to compensate the pedal force or the releasing force of the user, the user adjusts the braking force finely as intended.

The pedal operator 100 includes a piston 111 connected to the pedal 10, a housing 112 configured to form a space in which the piston 111 moves forward and backward, an elastic member 113 configured to provide a reaction force corresponding to a pedal force of the pedal 10, and a pedal spring 114 configured to provide an elastic force to return the pedal 10 to its initial position. The elastic member 113 may be formed of rubber, and the detail shape of the elastic member 113 may vary according to the designing method.

The pedal operator 100 may include pedal displacement sensors 120a and 120b measuring the braking intention of the user. The pedal operator 100 may be physically integrated in a valve block of the braking pressure regulator 300, and the pedal displacement sensors 120a and 120b may be directly and integrally connected to the electric control unit.

The pedal operator 100 may be connected to the pedal 10 via an input rod 11. One side of the input rod 11 may be connected to the pedal 10 so as to be linearly moved according to the displacement of the pedal 10. However, since the input rod 11 is connected to a point away from the rotation axis of the pedal 10, a slight upward and downward movement may occur.

Meanwhile, the shape of the elastic member 113 shown in the drawings is merely one embodiment capable of providing an elastic force to the piston 111, and thus the shape of elastic member 113 may have various shapes as long as capable of storing the elastic force by the deformation. For example, the elastic member 113 may be formed of a coil spring or a leaf spring.

The pedal spring 114 is resiliently deformed while the pedal 10 moves forward, and the pedal 10 is elastically restored while the pedal 10 is retracted, thereby providing a restoring force to the pedal 10. The pedal spring 114 may provide a restoring force such that the pedal 10 returns to its original position when the user releases his/her pedal force from the pedal 10.

The pedal operator 100 may be provided separately from a device supplying a braking pressure. For example, the braking pressure may be supplied only by the pressure supplier 200, which will be described later, and the pedal force of the pedal 10 is transmitted only to the pedal operator 100 while the pedal operator 100 cannot generate direct braking pressure. In other words, the pedal force unit connected from the pedal 10 to the pedal operator 100 and the hydraulic unit connected from the actuator 200 generating the hydraulic pressure to the wheel brake FR, FL, RR, and RL may be hydraulically separated from each other. The term "hydraulically separated" includes a meaning that the pedal force of the pedal 10 is not directly connected to the wheel brake FR, FL, RR, and RL through the working fluid.

The pedal force unit and the hydraulic unit are mechanically separated from each other. The term "mechanically separated" includes a meaning that power transmission using the mechanical element or the hydraulic pressure does not occur between the pedal force unit and the hydraulic unit. The pedal force unit and the hydraulic unit are electrically connected through the pedal displacement sensors 120a and 120b and the electronic control unit (ECU) (not shown).

However, that the pedal force unit and the hydraulic unit are mechanically separated from each other does not mean that the pedal force unit and the hydraulic unit are not structured as a single unit by being mechanically combined each other. That is, in order to reduce the weight and the volume, the pedal force unit and the hydraulic unit may be configured as a single unit.

Meanwhile, the electric brake system according to the first embodiment may perform the redundancy function by having the redundancy components.

Generally, a brake system in the electric manner usually employs a method in which a master cylinder is hydraulically connected to a wheel brake to form a minimum braking pressure even during abnormal operation. That is, in the fall back mode, the cut valve is opened and the hydraulic pressure of the master cylinder may be directly introduced into the wheel brake and thus the emergency braking pressure may be formed.

However, according to the first embodiment, without the master cylinder, the electric brake system may perform the normal braking function during abnormal operation of the electronic control unit or the pressure supplier 200. That is, by removing the master cylinder, the number, the weight and the volume of the component may be reduced. In addition, by removing the master cylinder, the flow path may be simplified and noise may be reduced. Further, even in the fall back mode, the same braking pressure as in the normal state may be generated.

The pressure supplier 200 includes a driver 201 and a piston pump unit 202 operated by the power of the driver 201. The driver 201 generates power by the electrical signals of the pedal displacement sensors 120a and 120b and the piston pump unit 202 generates the hydraulic pressure by the power of the driver 201 to provide the hydraulic pressure to the wheel brakes FR, FL, RR, and RL.

At this time, the pedal displacement sensors 120a and 120b obtain the displacement of the pedal 10 and transmit an electrical signal to the electronic control unit (ECU). The electronic control unit (ECU) identifies the braking pressure required by the user by analyzing the signals of the pedal displacement sensors 120a and 120b. The electronic control unit (ECU) outputs a signal for controlling the piston pump unit 202 and the various valves to obtain the required braking pressure.

The driver 201 includes a motor 210 generating a torque by the supply of power. The motor is a device for generating a torque by a signal output from an electronic control unit (ECU), and may generate the torque in a forward direction or a reverse direction. The rotational angular velocity and the rotational angle of the motor may be precisely controlled. Such a motor is a well-known technique, and thus a detailed description thereof will be omitted.

The motor 210 includes a stator 211 and a rotor 212. The stator 211 may be provided in a ring or donut shape forming a hollow portion. The rotor 212 may be provided in a hollow cylindrical shape and disposed in the hollow portion of the stator 211.

The driver 201 includes at least one magnetic body 213 generating the torque for the motor 210. The magnetic body 213 may be disposed on the outer circumferential surface of the rotor 212 and rotate together with the rotor 212. A gap is formed between the stator 211 and the magnetic body 213 to allow the rotor 212 to rotate without interference.

The driver 201 may further include a ball bearing 216 interposed between the motor 210 and the rotor 212. The ball bearing 216 may be installed on the inner circumferential surface of the hollow portion of the motor 210 to guide the rotation of the rotor 212.

The driver 201 includes a power transmitter converting the rotational motion of the motor 210 into a linear motion and transmitting the linear motion to the pressure supplier piston 222. The power transmitter may include a pin member 214 coupled with the rotor 212 to rotate together with the rotator 212 and a rotating shaft member 215 connected to the pin member 214 to rotate. For example, the rotor 212 is provided in a hollow cylindrical shape and a surface is provided at one end of the rotor 212 so that the pin member 214 is coupled to the end surface of the rotor 212.

The piston pump unit 202 includes a cylinder block, a pressure supply cylinder 220 in which a bore 221 is formed in the cylinder block, a piston rod 223 which reciprocates linearly by gearing with the rotating shaft member 215, a pressure supply piston 222 connected to the piston rod 223 and accommodated in the bore 221 so as to slidably move, and chambers 224 and 225 disposed between the pressure supply piston 222 and the pressure supply cylinder 220.

The pressure supply cylinder 220 may be connected to one side of the motor 210. Alternatively, the pressure supply cylinder 220 may be integrally formed with the motor 210. The pressure supply cylinder 220 forms the bore 221 which is a hollow portion for receiving the pressure supply piston 222. The bore 221 may extend in parallel to the rotation axis of the motor 210. That is, the pressure supply piston 222 may reciprocate linearly in a direction in parallel to the rotation axis of the motor 210.

The piston rod 223 may be a nut member that is nut-screw coupled with the rotating shaft member 215. For example, the rotating shaft member 215 forms a screw having the outer circumferential surface on which a screw thread is formed. The piston rod 223 includes a hollow portion, and an inner circumferential surface of the hollow portion is formed with a thread groove engaging with the screw thread of the rotating shaft member 215. That is, the rotational motion of the rotating shaft member 215 may be converted into a linear reciprocating motion of the piston rod 223.

Meanwhile, the rotating shaft member 215 and the piston rod 223 may be a ball-screw coupling in which a rolling ball is interposed between the screw thread and the thread groove. One side of the pressure supply cylinder 220 is opened to communicate with the bore 221. The piston rod 223 may penetrate into and enter the opening of the pressure supply cylinder 220.

An inner diameter of the opening of the pressure supply cylinder 220 is smaller than an inner diameter of the bore 221, and an outer diameter of the pressure supply piston 222 may be greater than an outer diameter of the piston rod 223. Accordingly, it is possible to prevent the pressure supply piston 222 from deviating to the outside of the bore 221.

The piston pump unit 202 may be provided with a double acting piston. That is, the piston pump unit 202 may include a first pump chamber 224 disposed in front of the pressure supply piston 222 and a second pump chamber 225 disposed behind the pressure supply piston 222.

The first pump chamber 224 and the second pump chamber 225 may be connected to one or more wheel brakes FR, FL, RR, and RL to provide the hydraulic pressure.

Meanwhile, when the pressure supply piston 222 moves forward, a hydraulic pressure may be generated in the first pump chamber 224 or a negative pressure may be generated in the second pump chamber 225. Conversely, when the pressure supply piston 222 moves backward, a negative pressure may be generated in the first pump chamber 224 or a hydraulic pressure may be generated in the second pump chamber 225. At this time, whether to provide the braking pressure to the wheel brakes FR, FL, RR, and RL using the hydraulic pressure of the chamber or whether to release the braking pressure using the negative pressure of the chamber is determined by the electronic control unit (ECU), wherein the determination is performed by controlling the valves.

The first pump chamber 224 is divided by the front end of the pressure supply cylinder 220 and the pressure supply piston 222, and the volume of the first pump chamber 224 is changed according to the movement of the pressure supply piston 222. The second pump chamber 225 is divided by the rear end of the pressure supply cylinder 220 and the pressure supply piston 222, and the volume of the second pump chamber 225 is changed according to the movement of the pressure supply piston 222.

The pressure supply piston 222 may be configured such that a first effective area forming the hydraulic pressure in the first pump chamber 224 is greater than a second effective area forming the hydraulic pressure in the second pump chamber 225. That is, the second effective area may be obtained by subtracting the cross-sectional area of the piston rod 223 from the cross-sectional area of the pressure supply piston 222.

The piston pump unit 202 may further include a first sealing member 226 preventing the working fluid of the second pump chamber 225 from leaking along the piston rod 223. The first sealing member 226 may be installed on the inner circumferential surface of the opening of the pressure supply cylinder 220. For example, a ring-shaped recessed groove is provided in the inner circumferential surface of the opening of the pressure supply cylinder 220, and a ring-shaped first sealing member 226 may be fitted in the recessed groove.

The piston pump unit 202 may further include a second sealing member 227 sealing the first pump chamber 224 and the second pump chamber 225. The second sealing member 227 may be mounted on the outer circumferential surface of the pressure supply piston 222 and move together with the pressure supply piston 222. For example, a flange shape may be provided at the front end and a rear end of the pressure supply piston 222, respectively and a ring-shaped second sealing member 227 may be fitted between the two flange shapes.

That is, the hydraulic pressure or the negative pressure of the first pump chamber 224, which is generated by the forward or backward movement of the pressure supply piston 222, is blocked by the second sealing member 227 and thus the hydraulic pressure or the negative pressure is not leaked to the second pump chamber 225. The hydraulic pressure or the negative pressure of the second pump chamber 225, which is generated by the forward or backward movement of the pressure supply piston 222, is blocked by the first sealing member 226 and thus the hydraulic pressure or the negative pressure is not leaked to the outside of the pressure supply cylinder 220.

The braking pressure regulator 300 may include an inlet line 310 connecting the pump chambers 224 and 225 to the wheel brake 20, an outlet line 320 connecting the wheel brake 20 to the reservoir 30, and a pump reservoir line 330 connecting the reservoir 30 to the pump chambers 224 and 225. That is, each of the pair of hydraulic circuits S1 and S2 includes the inlet line 310 having an analog normally open inlet valve V10 and connecting the pressure supplier 200 to the four wheel brakes 20, and the outlet line 320 having an analog normally open outlet valve V20 and directly or indirectly connecting the four wheel brakes 20 to the reservoir 30. The inlet valve V10 may include first to fourth inlet valves V11, V12, V13 and V14 and the outlet valve V20 may include first to fourth outlet valves V21, V22, V23 and V24.

The inlet line 310 may include a first inlet line 311 allowing only one-way flow from the first pump chamber 224 to the inlet valves V11 and V12 of the first hydraulic circuit S1 through a check valve 311a, a second inlet line 312 allowing only one-way flow from the second pump chamber 225 to the inlet valves V13 and V14 of the second hydraulic circuit S2 through a check valve 312a, a third inlet line 313 allowing only one-way flow from the second pump chamber 225 to the inlet valves V11 and V12 of the first hydraulic circuit S1 through a check valve 313a, and a fourth inlet line 314 allowing only one-way flow from the first pump chamber 224 to the inlet valves V13 and V14 of the second hydraulic circuit S2 through a check valve 314a.

The check valves 311a, 312a, 313a, and 314a provided in the respective inlet lines 310 may be maintained in a state of being pressurized by the elastic force so as to prevent the leakage flowing from the first pump chamber 224 or the second pump chamber 225 to the wheel brake 20.

The independence of the pair of the hydraulic circuit S1 and S2 may be implemented by the check valves 311a, 312a, 313a, and 314a provided in the inlet line 310 connecting the first and second pump chamber 224 and 225 of the pressure supplier 200 to the inlet valves V11, V12, V13, and V14 of the first hydraulic circuit S1 or the second hydraulic circuit S2.

The outlet line 320 may include first and second outlet lines 321 and 322. At this time, the first outlet line 321 may connect the first and second outlet valves V21 and V22 to the reservoir 30, and the second outlet line 322 may connect the third and fourth outlet valves V23 and V24 to the reservoir 30.

The inlet valve V10 and the outlet valve V20 operate as a coil or coil set, and the inlet valve V10 and the outlet valve V20 may be connected to two different power nets so that the inlet valve V10 and the outlet valve V20 are operated by the other power net even when any one power net malfunctions. Furthermore, the inlet valve V10 and the outlet valve V20 may be connected to two different power nets to prevent simultaneous closing caused by malfunction. The electrical performance of the inlet valve V10 is independent of the electrical performance of the outlet valve V20 and thus it may be possible to prevent simultaneous closing caused by malfunctions.

According to the disclosure, as for the inlet valve V10, the check valve configured to prevent back flow may be not disposed in parallel, wherein the back flow occurs when the pressure of the pressure supplier 200 is lower than the pressure of the wheel brake. In the same manner, as for the outlet valve V20, the check valve configured to prevent back flow may be not disposed in parallel, wherein the back flow occurs when the pressure of a discharge port is higher than the pressure of the wheel brake.

The pump reservoir line 330 may include a first pump reservoir line 331 allowing only one-way flow from the reservoir 30 to the first pump chamber 224 by having a check valve 331a, a second pump reservoir line 332 allowing only one-way flow from the reservoir 30 to the second pump chamber 225 by having a check valve 332a, a third pump reservoir line 333 allowing only one-way flow from the first pump chamber 224 to the reservoir 30 by having a check valve 333a, wherein the third pump reservoir line 333 is provided with a first dump valve V31, and a fourth pump reservoir line 334 allowing only one-way flow from the second pump chamber 225 to the reservoir 30 by having a check valve 334a, wherein the fourth pump reservoir line 334 is provided with a second dump valve V32.

As for the pump reservoir line 330 configured as described above, the first and second pump chambers 224 and 225 may be independently connected to the reservoir 30 in the hydraulic manner, by using the first dump valve V31 controlling the opening and closing of the third pump reservoir line 333 and by using the second dump valve V32 controlling the opening and closing of the fourth pump reservoir line 334.

The pedal displacement sensors 120a and 120b detect the displacement of the pedal 10 and transmit an electrical signal to the electronic control unit (ECU). The electronic control unit (ECU) identifies the braking pressure required by the user by analyzing the signals of the pedal displacement sensors 120a and 120b. The electronic control unit (ECU) outputs a signal for controlling the piston pump unit 202 and the various valves to obtain the required braking pressure.

Circuit hydraulic pressure sensors 130a and 130b may be provided to detect the hydraulic pressure of the hydraulic circuit 400. For example, the circuit hydraulic pressure sensors 130a and 130b include a first circuit hydraulic pressure sensor 130b connected to a first hydraulic flow path 230 to detect the hydraulic pressure, and a second circuit hydraulic pressure sensor 130a connected to a second hydraulic flow path 231 to detect the hydraulic pressure. At this time, the first circuit hydraulic pressure sensor 130b may be disposed between the first pump chamber 224 and the first and second inlet valves V11 and V12, and the second circuit hydraulic pressure sensor 130a may be disposed between the second pump chamber 225 and the third and fourth inlet valves V13 and V14.

When the two inlet valves V11 and V12 contained in the first hydraulic circuit S1 are opened or when the pressures of the wheel brakes 21 and 22 are different, any one inlet valve V11 is closed and the other inlet valve V12 is opened. Accordingly, the first circuit hydraulic pressure sensor 130b may measure a wheel pressure applied to any one of wheel brakes 21 and 22 connected to the first hydraulic circuit S1. In addition, as for the second hydraulic circuit S2, a single second circuit hydraulic pressure sensor 130a may measure a wheel pressure of both wheel brakes 23 and 24.

Driving displacement sensors 140a and 140b may be provided to detect the displacement of the driver 201. For example, the driving displacement sensors 140a and 140b may detect the rotation angle of the motor 210. Alternatively, the driving displacement sensors 140a and 140b may detect any one of current, voltage, and torque of the driver 201.

The reservoir displacement sensor 150 may be provided to detect the level of the reservoir 300.

Meanwhile, the electronic control unit (ECU) may have a redundancy function. To this end, the driver 201 may include a first power net connected to the first driver 201a and a second power net connected to the second driver 201b. In this case, the first driver 201*a* and the second driver 201*b* may be the stator 211 of the motor 210 operated by independent signals.

The electronic control unit (ECU) may include a first electronic control unit connected to the first power net and a second electronic control unit connected to the second power net. The second power net may be configured to operate selectively or together with the first power net. Thus, when the first electronic control unit operates abnormally in a state in which the second power net is configured to selectively operate with the first power net, the second power net may operate by the signal of the second electronic control unit and thus the operation of the driver 201 may be not stopped. In contrast, when the second electronic control unit operates abnormally, the first power net may operate by the signal of the first electronic control unit and thus the operation of the driver 201 may be not stopped.

When the first electronic control unit operates abnormally, the electronic control unit (ECU) may prevent the abnormal operation of the driver 201 by blocking the signal of the first electronic control unit and by allowing the second power net to be operated by the signal of the second electronic unit. In contrast, when the second electronic control unit operates abnormally, the electronic control unit (ECU) may prevent the abnormal operation of the driver 201 by blocking the signal of the second electronic control unit and by allowing the first power net to be operated by the signal of the first electronic unit.

Further, one or more of solenoid valves controlled by the electronic control unit may include two coils each connected to the first and second electronic control units. One of the two coils may be operated by the second electronic control unit when the first electronic control unit operates abnormally, and the other coil may be operated by the first electronic control unit when the second electronic control unit operates abnormally.

The electronic control unit (ECU) may include the pedal displacement sensors 120*a* and 120*b* detecting the displacement of the pedal, the circuit hydraulic pressure sensors 130*a* and 130*b* detecting the hydraulic pressure of the first or second hydraulic circuit S1 and S2, and the driving displacement sensors 140*a* and 140*b* detecting the amount of rotation of the driver 201. The pedal displacement sensors 120*a* and 120*b*, the circuit hydraulic pressure sensors 130*a* and 130*b* and the driving displacement sensors 140*a* and 140*b* include a main sensor and an auxiliary sensor, respectively. The auxiliary sensor may be a redundancy sensor configured to operate when the main sensor operates abnormally.

According to the first embodiment, the electric brake system may be provided in an integrated parking brake (IPB) type, wherein one or more wheel brakes 20 associated with parking brakes electrically operated is provided, the one or more wheel brakes 20 is connected the first and second power net operating independently of each other, and thus a wheel brake selectively operated by the electronic control unit and a parking brake are integrated.

FIGS. 3 to 18 respectively show an electric brake system according to second to tenth embodiments. In the following description of the electric brake system according to the second to tenth embodiments, the same reference numerals will be used to refer to the same elements in the description of the electric brake system according to the first embodiment unless otherwise specifically noted, and thus description thereof will be omitted in order to avoid duplication of contents.

Figure 3:
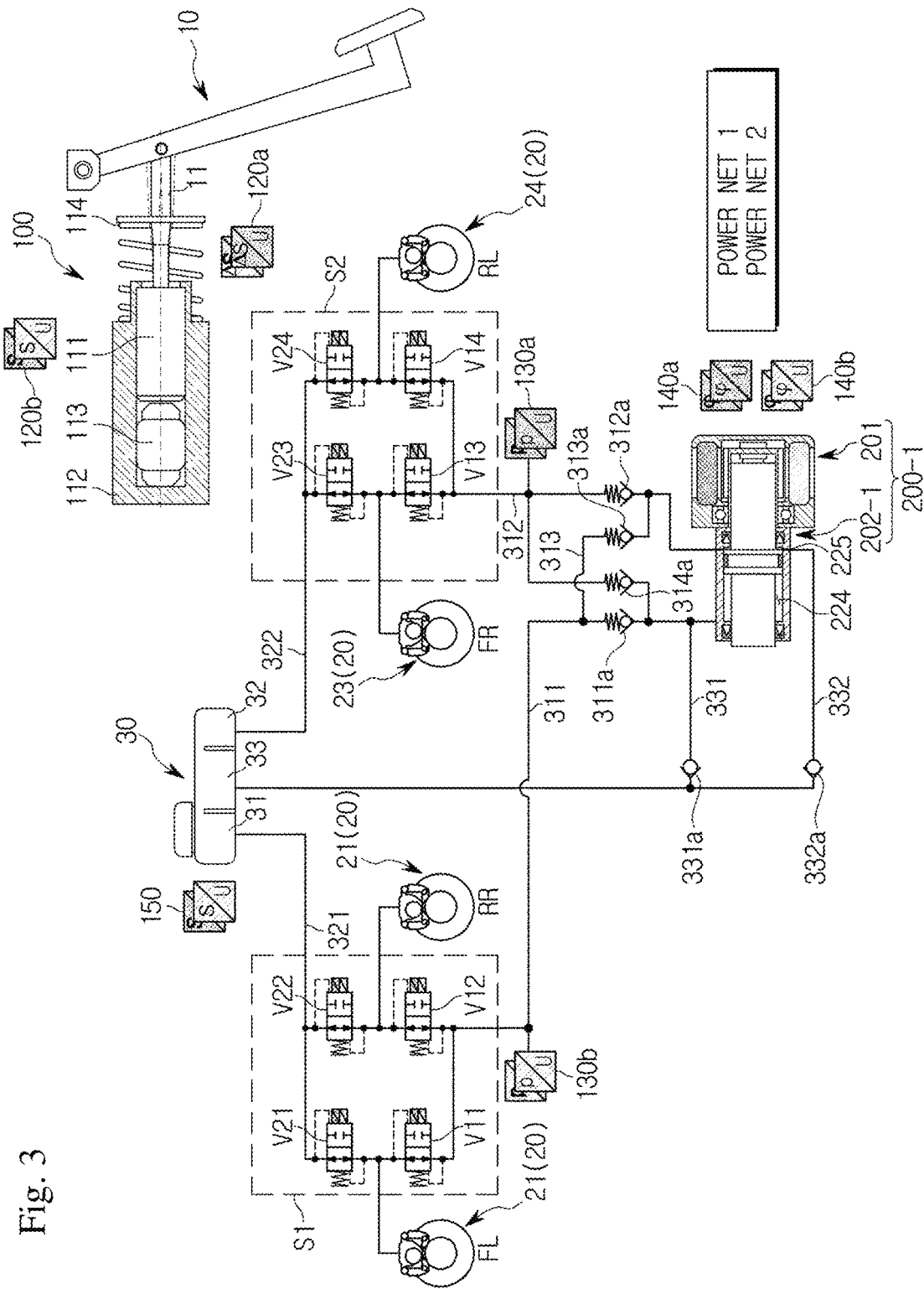
FIG. 3 is a view illustrating an electric brake system according to a second embodiment.
Figure 4:
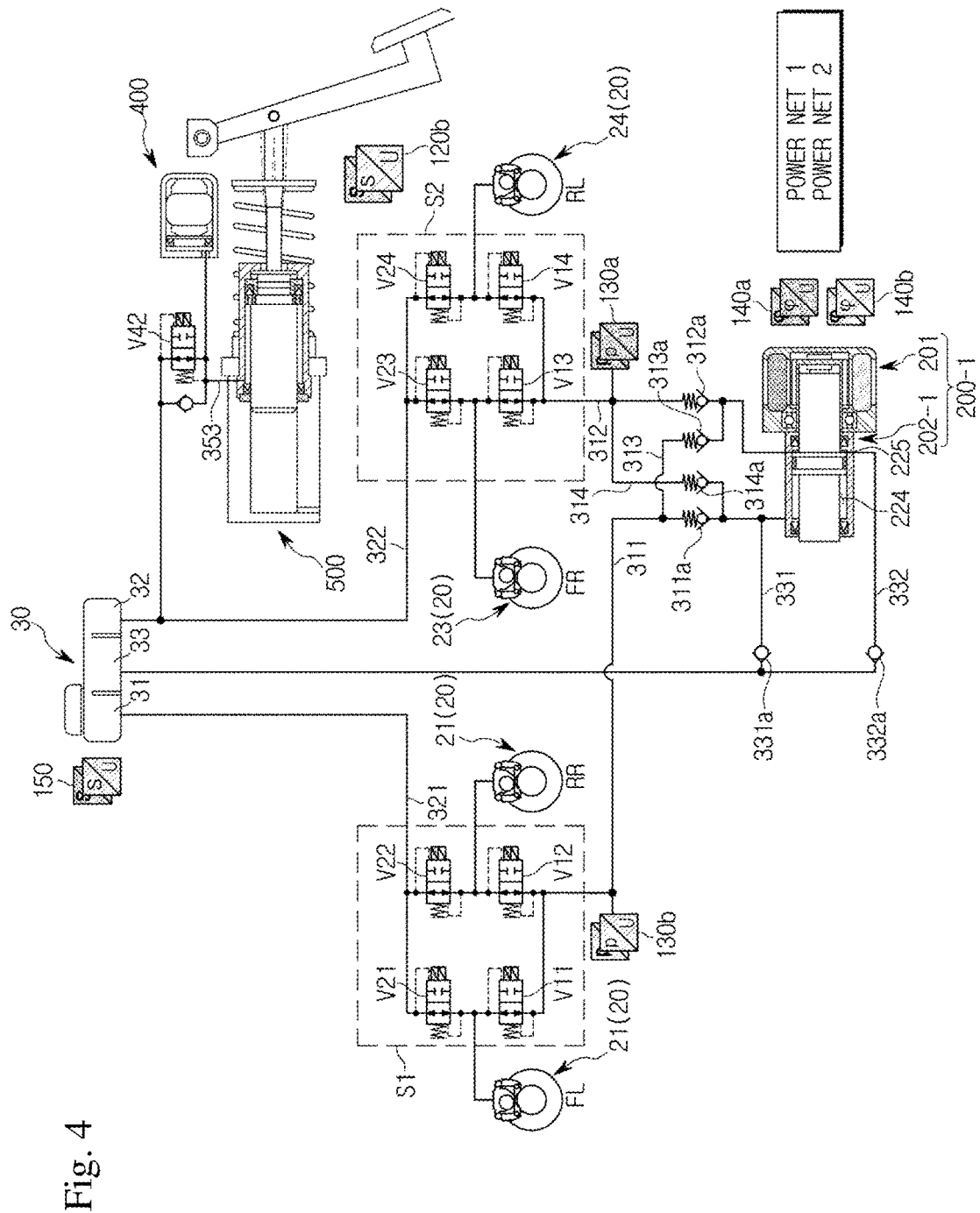
FIG. 4 is a view illustrating a pressure supplier according to the second embodiment.

Referring to FIGS. 3 and 4, as for an electric brake system according to the second embodiment, a pressure supplier 200-1 in a different type from the pressure supplier 200 according to the first embodiment is provided, and the third pump reservoir line 333 provided with the check valve 334*a* and the first dump valve V31 and the fourth pump reservoir line 334 provided with the check valve 334*a* and the second dump valve V32 may be omitted.

A piston pump unit 202-1 of the pressure supplier 200-1 is provided such that piston rods 223 and 228 are connected to opposite sides of a pressure supply piston 222.

Referring to FIG. 3, on one side of the pressure supply piston 222, a first piston rod 223 screw-nut coupling with a rotating shaft member 215 extends in a direction of a second chamber 225, and on the other side thereof, a second piston rod 228 passing through a pressure supply cylinder 220 extends in a first chamber 224.

The pressure supply cylinder 220 has a first opening communicating with a bore 221 receiving the pressure supply piston 222 and through which the first piston rod 223 is passed, and a second opening communicating with the bore 221 and through which the second piston rod 228 is passed.

The pressure supply piston 222 may be configured such that a first effective area forming the hydraulic pressure in the first pump chamber 224 is the same as a second effective area forming the hydraulic pressure in the second pump chamber 225. That is, the cross-sectional area of the first piston rod 223 may be the same as the cross-sectional area of the second piston rod 228.

The piston pump unit 202-1 may further include a third sealing member 229 preventing the working fluid of the first chamber 224 from leaking to the outside of the pressure supply cylinder 220 along the second piston rod 228. The third sealing member 229 may be installed on the inner circumferential surface of the second opening of the pressure supply cylinder 220. For example, a recessed groove having a ring shape may be provided on the inner circumferential surface of the second opening of the pressure supply cylinder 220 and the third sealing member 229 having the ring shape may be fitted into the recessed groove.

Figure 5:
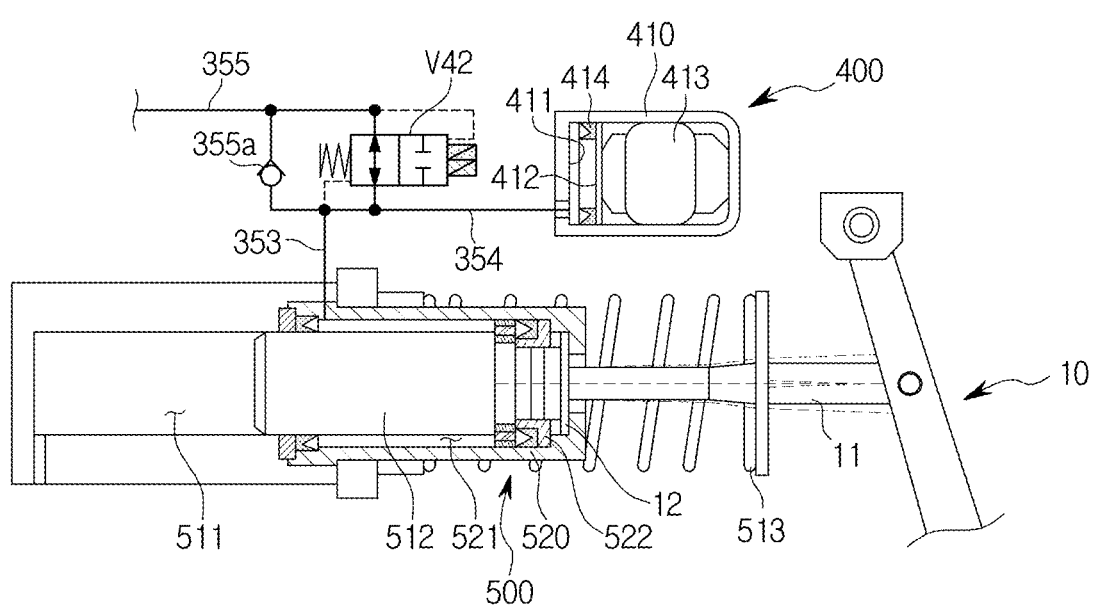
FIG. 5 is a view illustrating an electric brake system according to a third embodiment.
Figure 6:
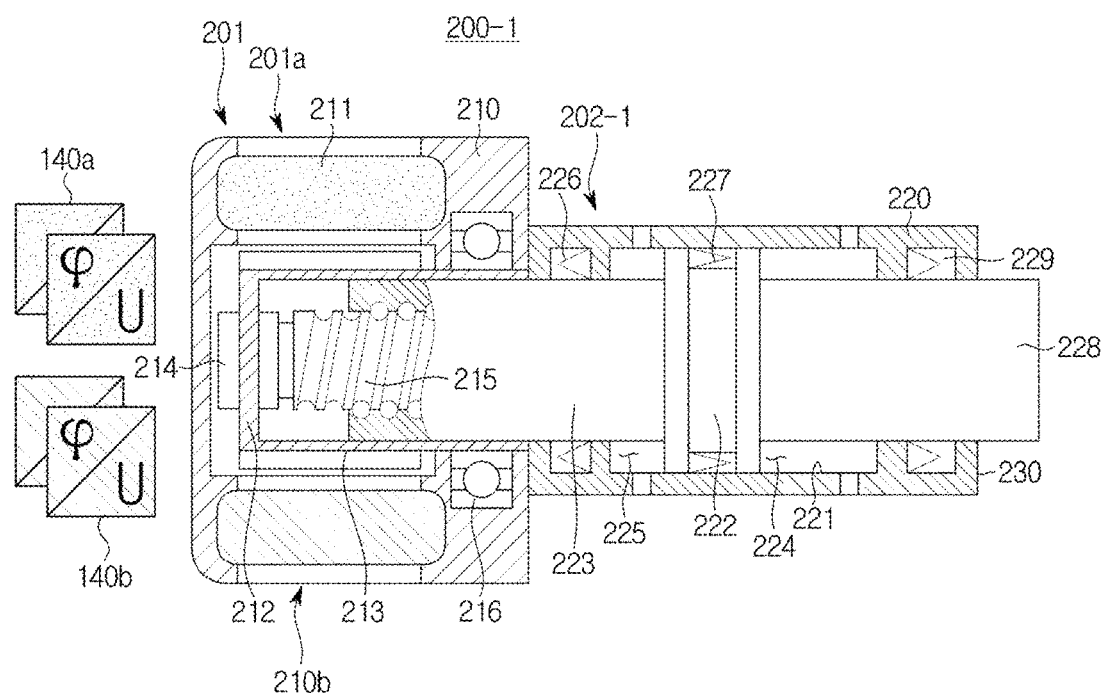
FIG. 6 is a view illustrating a pedal operator according to the third embodiment.

Referring to FIGS. 5 and 6, according to a third embodiment, the pedal operator 100 according to the second embodiment may be divided into a simulator unit 400 and a cylinder unit 500. Particularly, the cylinder unit 500 connected to the pedal 10 is separated from the simulator unit 400 configured to provide a reaction force corresponding to the pedal force by being connected to the cylinder unit 500, unlike the case where the system in which one pedal operator 100 is connected to the pedal 10 and at the same time the pedal operator 100 serves as a pedal simulator.

The pedal operators 400 and 500 include the cylinder unit 500 provided with a first piston 512 connected to the pedal and the simulator unit 400 hydraulically connected to the cylinder unit 500 to provide a reaction force corresponding to the pedal force of the pedal. The pedal operators 400 and 500 may be provided independent of a braking pressure regulator 300 in the hydraulic manner. At this time, the movement of a pressing member 522 may be measured by a pedal displacement sensor 120*b*.

The pedal operators 400 and 500 may include the cylinder unit 500 and the simulator unit 400 hydraulically connected to the cylinder unit 500 to provide a reaction force corresponding to the pedal force of the pedal, wherein the cylinder unit 500 may include the first piston 512 connected to the pedal, a cylinder chamber 511 variable in volume by the first piston 512, and a pressure chamber 521 variable in volume by the pressing member 522.

The simulator unit 400 includes a simulator chamber 411 connected to a housing 410 and the cylinder chamber 511, a piston 412 accommodated in the housing 410 and configured to contract or expand the simulator chamber 411, an elastic member 413 configured to apply an elastic force to the piston 412, and a sealing member 414 configured to seal the simulator chamber 411.

In the third embodiment, the cylinder chamber 511 is not directly connected to the hydraulic circuit. Therefore, the inside of the cylinder chamber 511 is provided with an empty space or connected to the pressure chamber 521 to temporarily store the working fluid. Accordingly, the pedal operators 400 and 500 may be provided independent of a braking pressure regulator 300 in the hydraulic manner. When the first piston 512 moves forward, the cylinder chamber 511 may discharge the air stored therein to a narrow flow path, thereby generating the resistance and providing a pedal feel.

The cylinder unit 500 includes a pedal spring 513 connected to the input rod 11 to provide a retracting force to the first piston 512, wherein the pressing member 522 may be pressed and then retracted by the first piston 512 when the first piston 512 is retracted.

The first piston 512 is connected to the pedal 10 via the input rod 11 to receive a forward force in a direction in which the cylinder chamber 511 is retracted. The pressing member 522 receives a forward force in a direction in which the pressure chamber 521 is retracted, by the locking protrusion 12 provided in the input rod 11. Therefore, the forward and backward movements of the first piston 512 and the pressing member 522 may be independently performed.

In the third embodiment, a third reservoir line 353 may be branched into a fourth reservoir line 354 connecting the pressure chamber 521 to the simulator unit 400, and a fifth reservoir line 355 connecting the pressure chamber 521 to the reservoir 30. At this time, a check valve 355a and a second reservoir valve V42 may be installed in parallel to each other on the fifth reservoir line 355.

Figure 7:
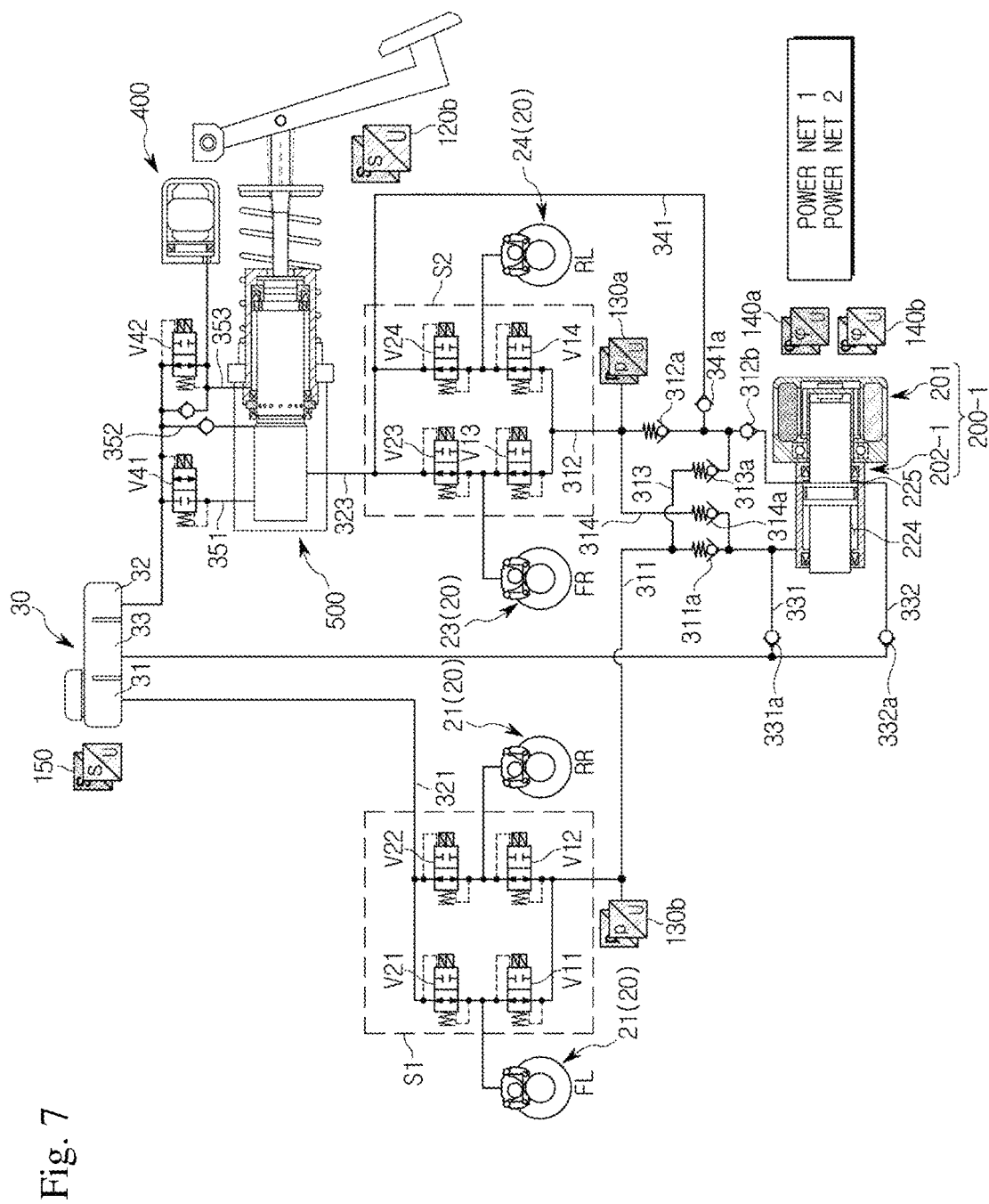
FIG. 7 is a view illustrating an electric brake system according to a fourth embodiment.
Figure 8:
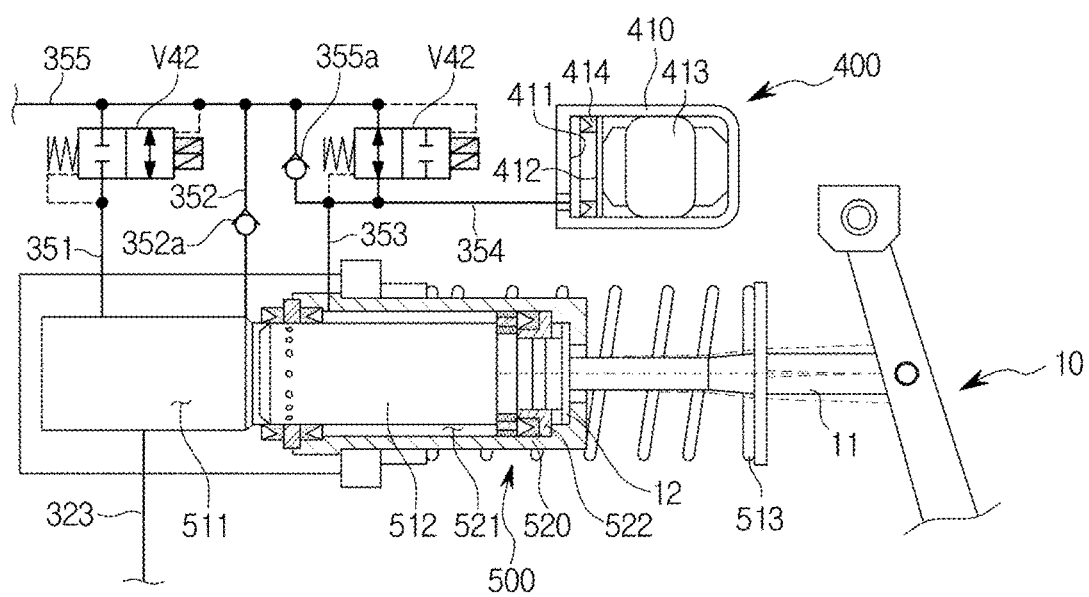
FIG. 8 is a view illustrating a pedal operator according to the fourth embodiment.

Referring to FIGS. 7 and 8, according to a fourth embodiment, a first reservoir line 351 connecting a cylinder chamber 511 to a reservoir 30, and a second reservoir line 352 having a check valve 352a allowing only one-way flow from the reservoir 30 to the cylinder chamber 511 may be further provided. A normally closed first reservoir valve V41 may be installed on the first reservoir line 351.

Further, a third outlet line 323 connecting the cylinder chamber 511 to outlet valves V23 and V24 of the second hydraulic circuit S2, and a first cylinder line 341 being connected from the cylinder chamber 511 to a second inlet line 312 may be further provided.

A first check valve 312a and a second check valve 312b, which are disposed in series to each other to prevent back flow, may be provided on the second inlet line 312 connected from the pressure supplier 200 to inlet valves V13 and V14 of the second hydraulic circuit S2. A check valve 341a preventing back flow may be provided on the first cylinder line 341 connected from the cylinder chamber 511 to between the first check valve 312a and the second check valve 312b.

Figure 9:
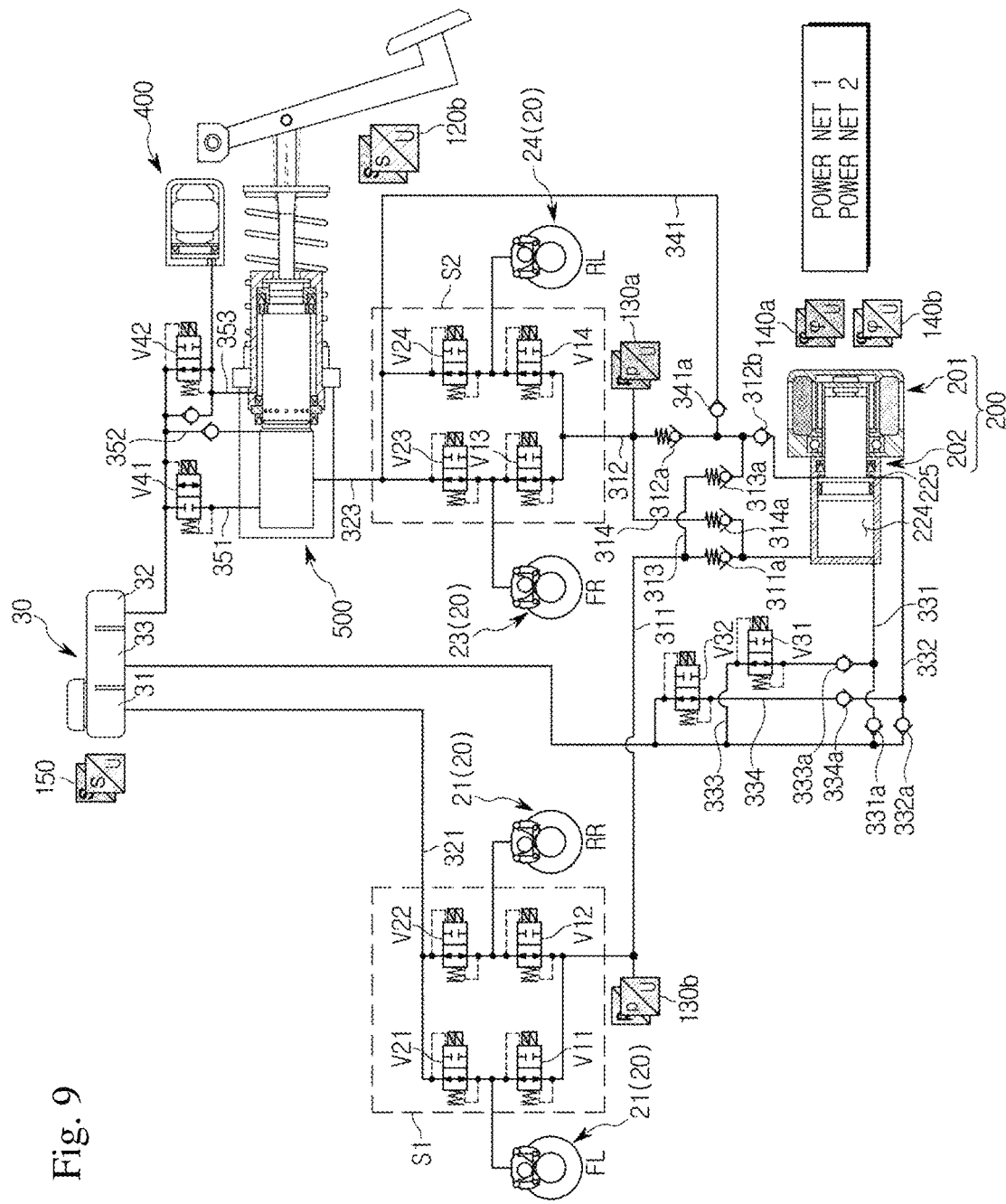
FIG. 9 is a view illustrating an electric brake system according to a fifth embodiment.

Referring to FIG. 9, an electric brake system according to a fifth embodiment may be configured such that a first dump valve V31 and a second dump valve V32 are more provided to the electric brake system according to the fourth embodiment.

A third pump reservoir line 333 which is configured to allow only one-way flow from the first pump chamber 224 to the reservoir 30 by having a check valve 333a and provided with the first dump valve V31, and a fourth pump reservoir line 334 which is configured to allow only one-way flow from the second pump chamber 225 to the reservoir 30 by having a check valve 334a and provided with the second dump valve V32 may be provided. Therefore, the first and second pump chambers 224 and 225 may be connected independently of each other in the hydraulic manner.

The first dump valve V31 and the second dump valve V32 may open or close the third pump reservoir line 333 and the fourth pump reservoir line 334, respectively.

Figure 10:
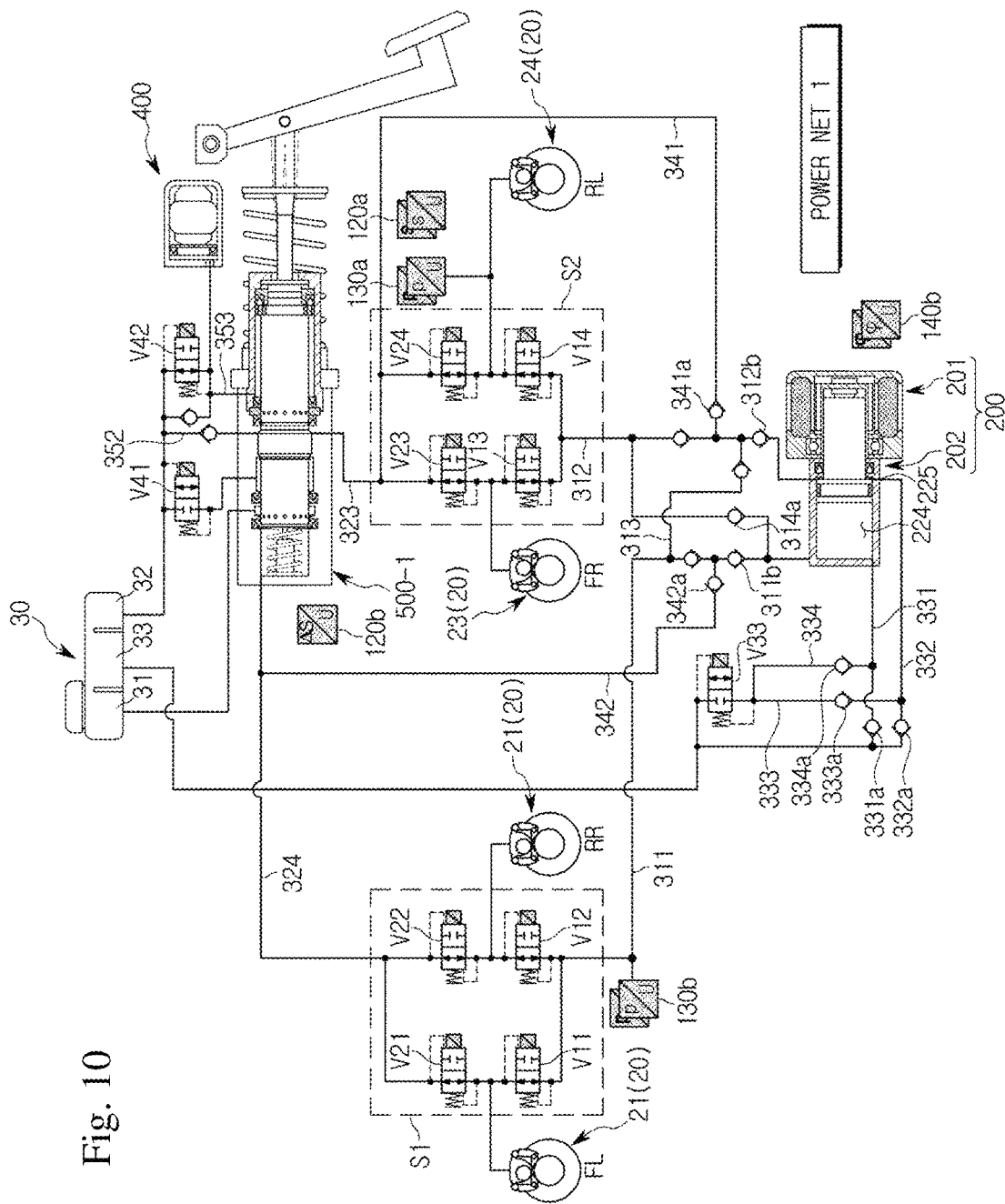
FIG. 10 is a view illustrating an electric brake system according to a sixth embodiment.
Figure 11:
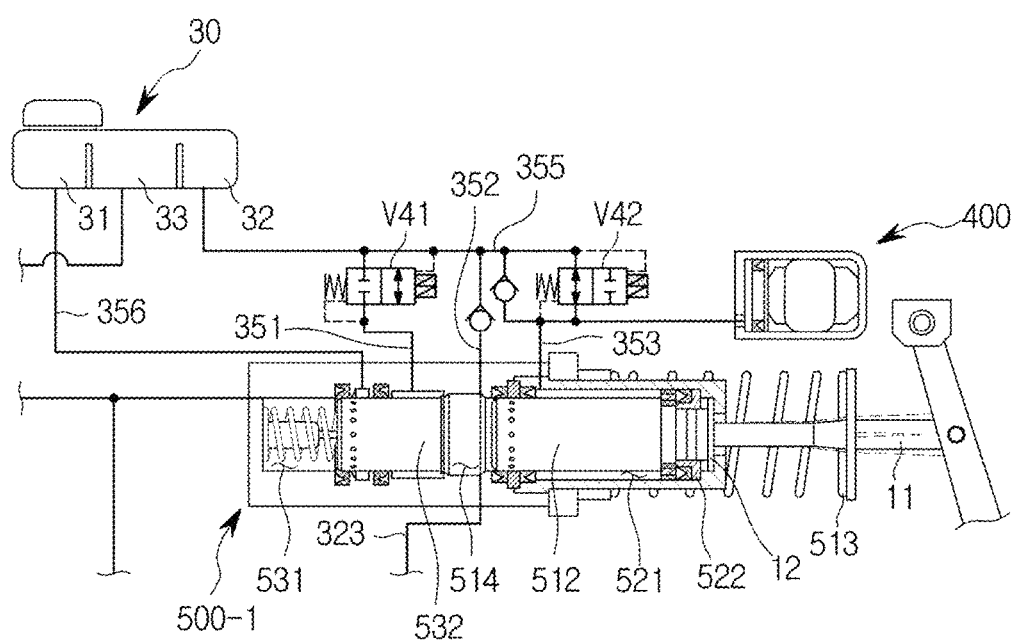
FIG. 11 is an enlarged-view illustrating a pedal operator according to the sixth embodiment.
Figure 12:
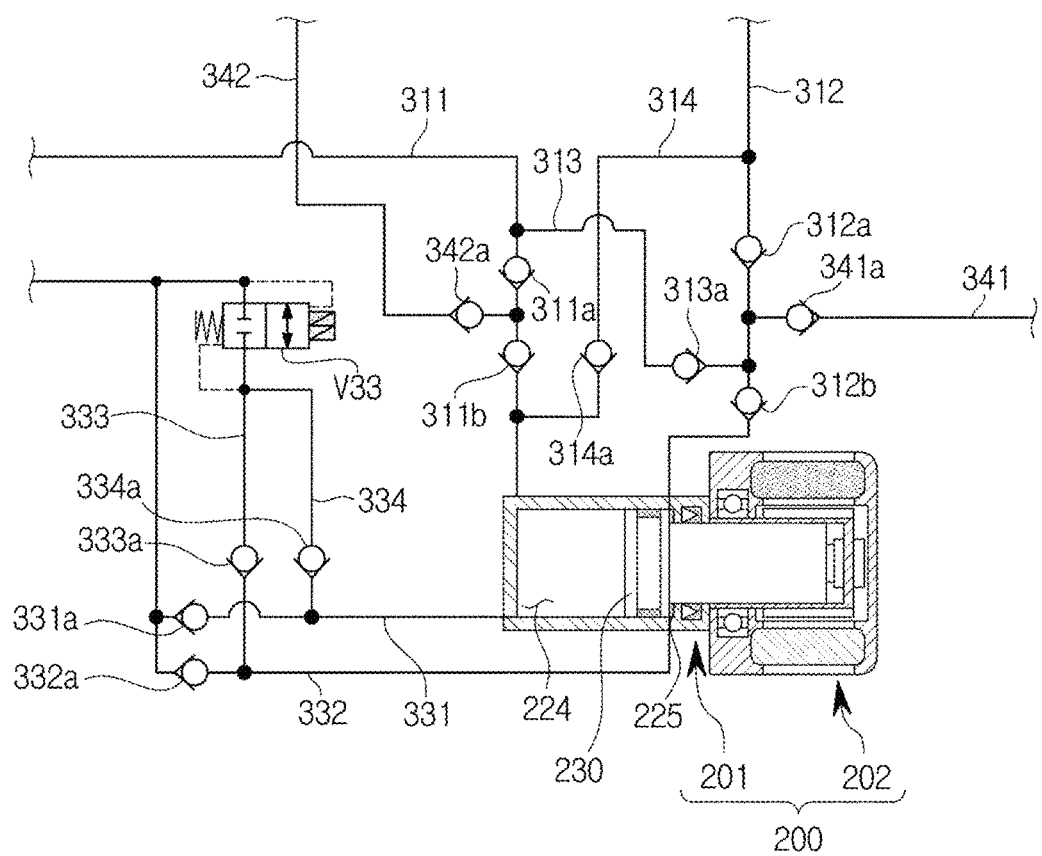
FIG. 12 is an enlarged-view illustrating a pressure supplier according to the sixth embodiment.

Referring to FIGS. 10 to 12, an electric brake system according to a sixth embodiment may include a third pump reservoir line 333 configured to allow only one-way flow from the first pump chamber 224 to the reservoir 30 by having a check valve 333a and a fourth pump reservoir line 334 configured to allow only one-way flow from the second pump chamber 225 to the reservoir 30 by having a check valve 334a, wherein a third dump valve V33 may be provided in a fifth pump reservoir line 335 in which the third pump reservoir line 333 and the fourth pump reservoir line 334 join. Therefore, it may be possible to regulate the flow of the working fluid flowing on the fourth pump reservoir line 334 and the fifth pump reservoir line 335 by using a single third dump valve V33.

The electric brake system according to the sixth embodiment may further include a second piston 532 configured to divide a cylinder chamber of the cylinder unit 500-1 into a first cylinder chamber 514 and a second cylinder chamber 531, wherein the first cylinder chamber 514 is connected to a second hydraulic circuit S2 through a third outlet line 323 or a first cylinder line 341, and the second cylinder chamber 531 is connected to a first hydraulic circuit S1 through a fourth outlet line 324 or a cylinder line 342.

Meanwhile, first check valves 311a and 312a and second check valves 311b and 312b configured to prevent back flow may be installed on a first inlet line 311 and a second inlet line 312 connected from the pressure supplier 200 to the inlet valve V10 of the first and second hydraulic circuits S1 and S2. A check valve 341a configured to prevent back flow to the first cylinder chamber 514 may be provided on the first cylinder line 341 connected from the first cylinder chamber 514 to the second inlet line 312. A check valve 342a configured to prevent back flow to the second cylinder chamber 531 may be provided on the second cylinder line 342 connected from the second cylinder chamber 531 to the first inlet line 311.

Figure 13:
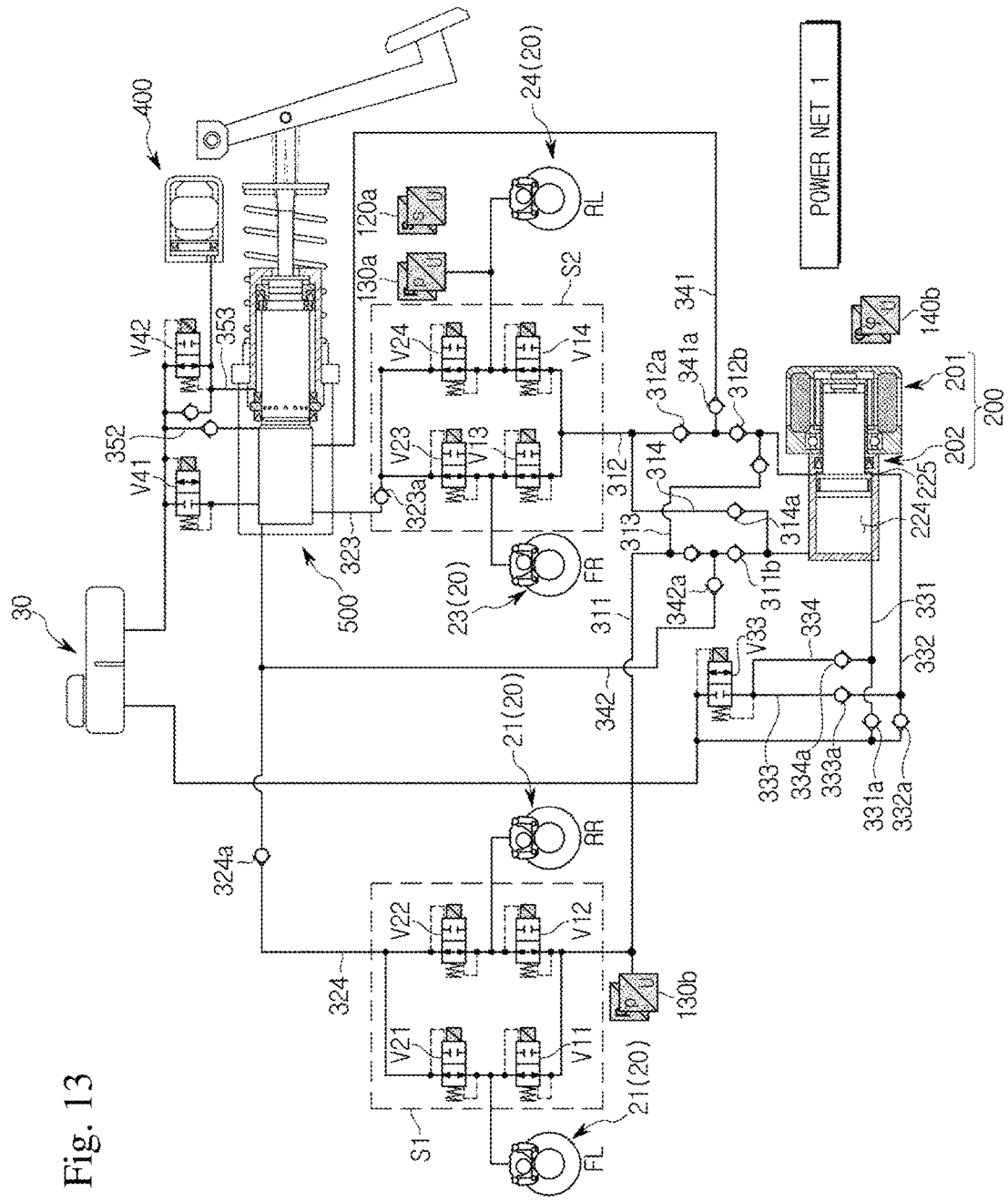
FIG. 13 is a view illustrating an electric brake system according to a seventh embodiment.

Referring to FIG. 13, an electric brake system according to a seven embodiment may include a third outlet line 323 configured to allow only one-way flow from inlet valves V13 and V14 of the second hydraulic circuit S2 to the cylinder chamber 511 through a check valve 323a, and a fourth outlet line 324 configured to allow only one-way flow from inlet valves V11 and V12 of the first hydraulic circuit S1 to the cylinder chamber 511 through a check valve 324a. It may be possible to block the flow of the fluid flowing to the outlet valve V20 from the cylinder chamber 511 through the third outlet line 323 and the fourth outlet line 324, by adding the check valves 323a and 324a to the third outlet line 323 and the fourth outlet line 324.

Figure 14:
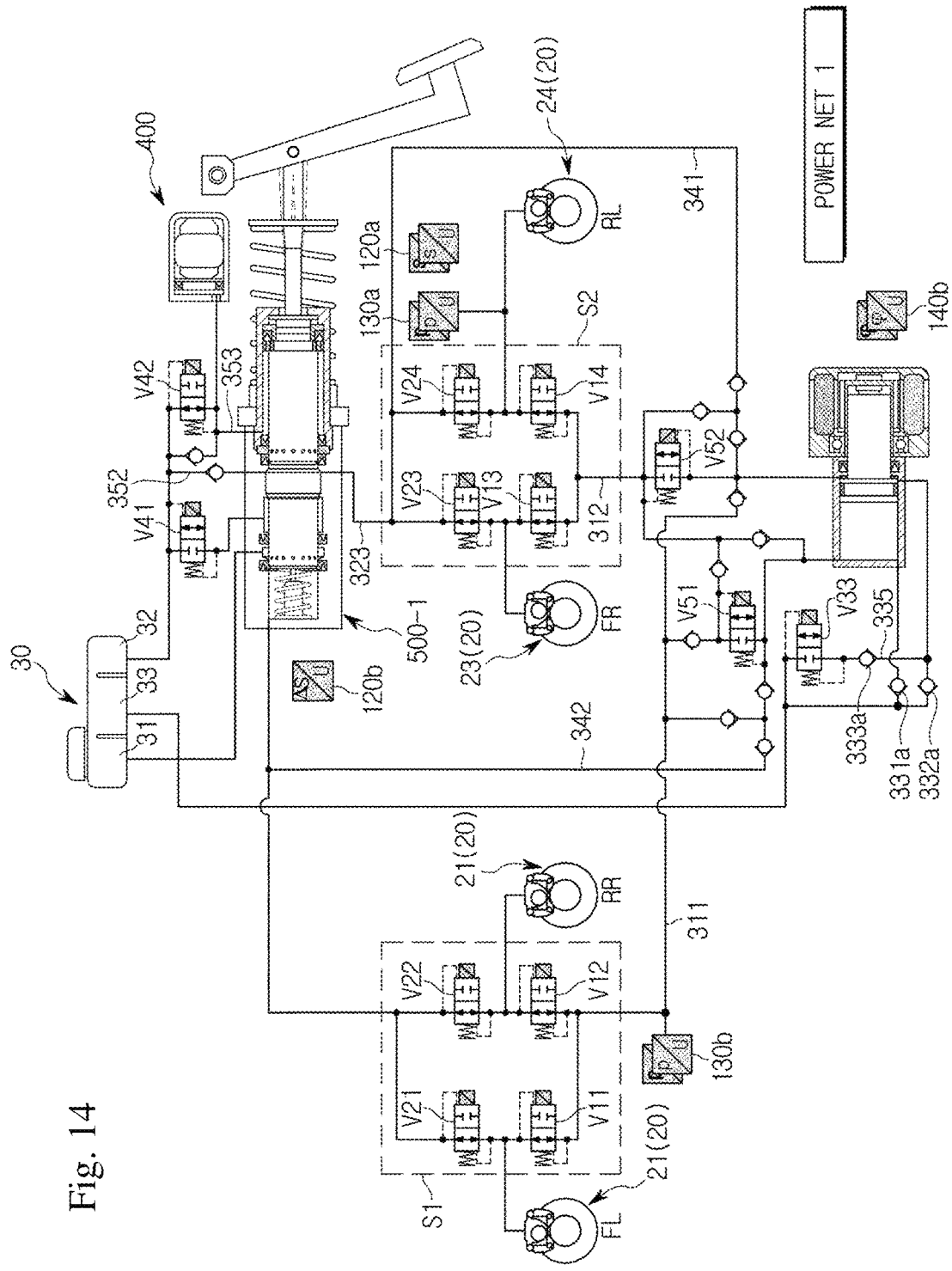
FIG. 14 is a view illustrating an electric brake system according to an eighth embodiment.
Figure 15:
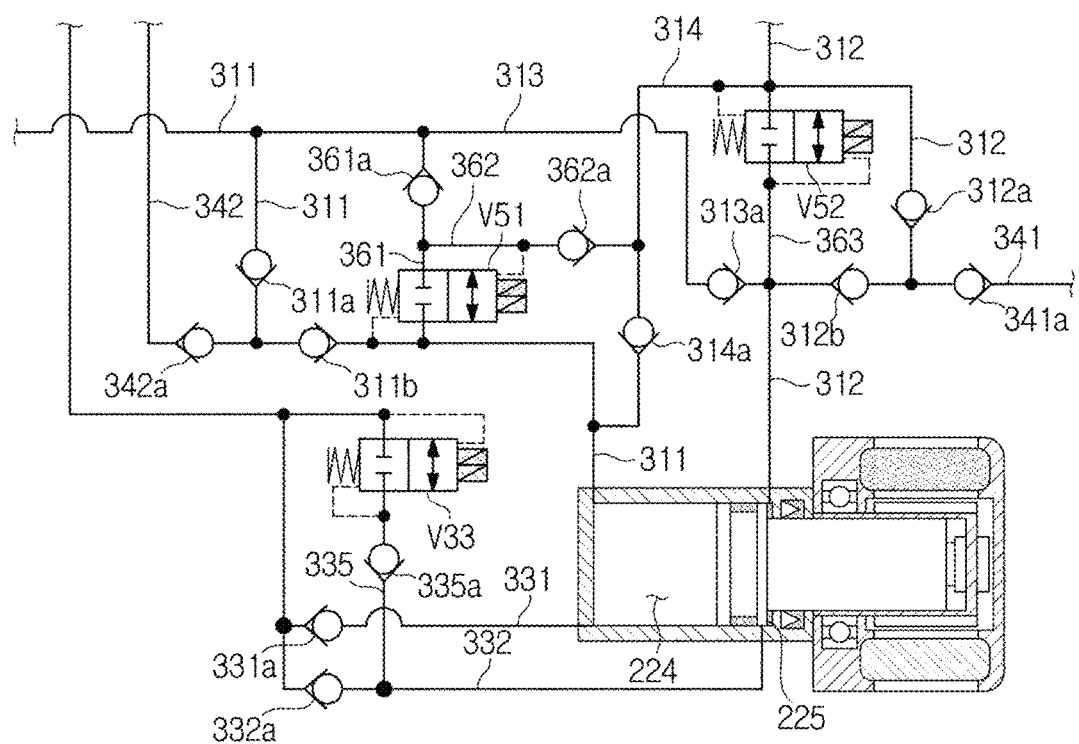
FIG. 15 is an enlarged-view illustrating a pressure supplier according to the eighth embodiment.

Referring to FIGS. 14 and 15, an electric brake system according to an eighth embodiment may further include a first connection line 361 allowing only one-way flow from a third inlet line 313 to a first inlet line 311 through a check valve 361a, a second connection line 362 allowing only one-way flow from a fourth inlet line 314 to the first connection line 361 through a check valve 362a, and a third connection line 363 provided in parallel to a second inlet line 312, wherein a normally closed first control valve V51 may be installed on the first connection line 361, and a normally closed second control valve V52 may be installed on the third connection line 363.

In the same manner as the above mentioned embodiments, the inlet line 310 includes a first inlet line 311 configured to allow only one-way flow from a first pump chamber 224 to an inlet valve of the first hydraulic circuit S1 through a check valve, a second inlet line 312 configured to allow only one-way flow from a second pump chamber 225 to an inlet valve of the second hydraulic circuit S2 through a check valve, a third inlet line 313 configured to allow only one-way flow from the second pump chamber 225 to the inlet valve of the first hydraulic circuit S1 through a check valve, and a fourth inlet line 314 configured to allow only one-way flow from the first pump chamber 224 to the inlet valve of the second hydraulic circuit S2 through a check valve.

Figure 16:
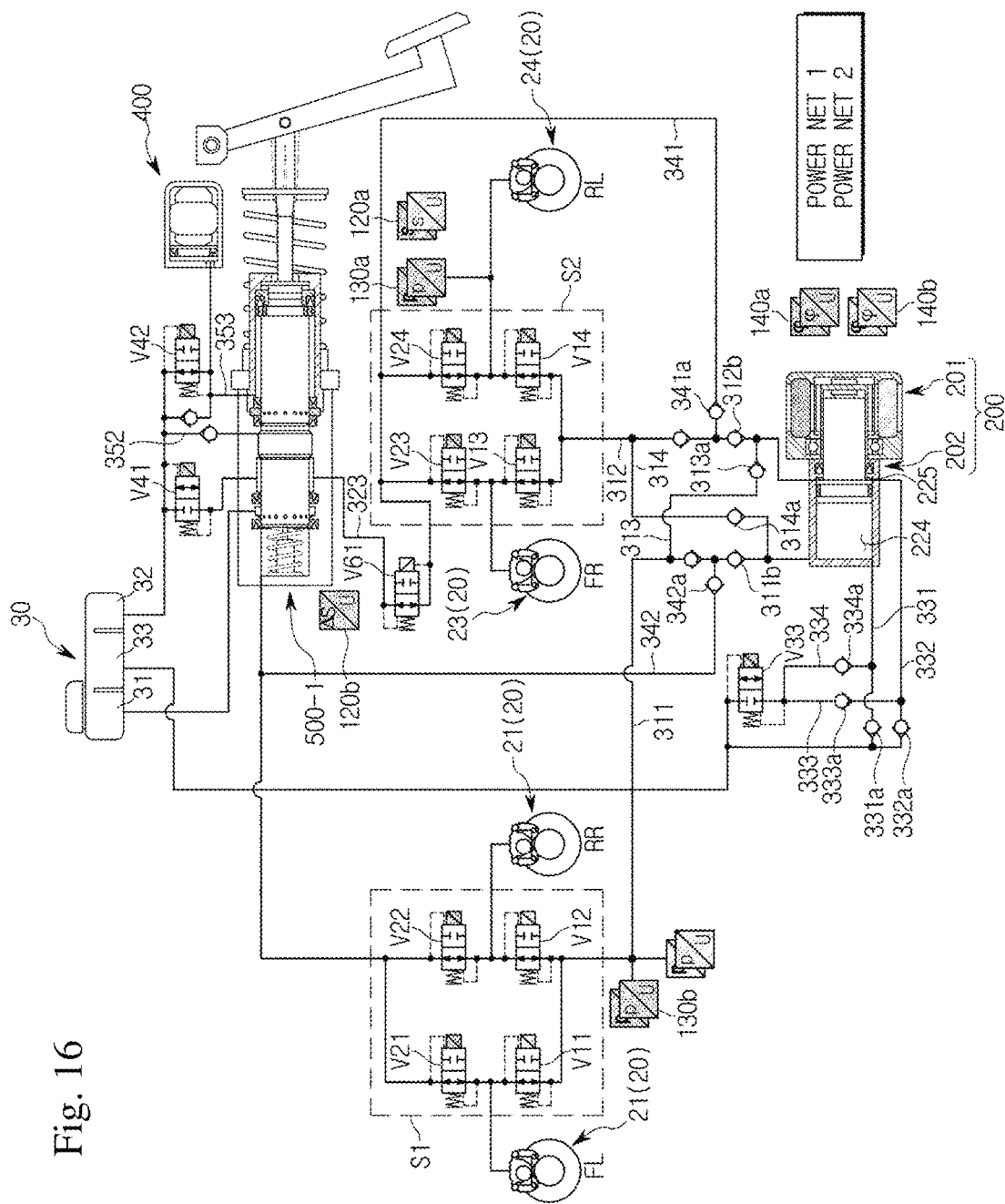
FIG. 16 is a view illustrating an electric brake system according to a ninth embodiment.
Figure 17:
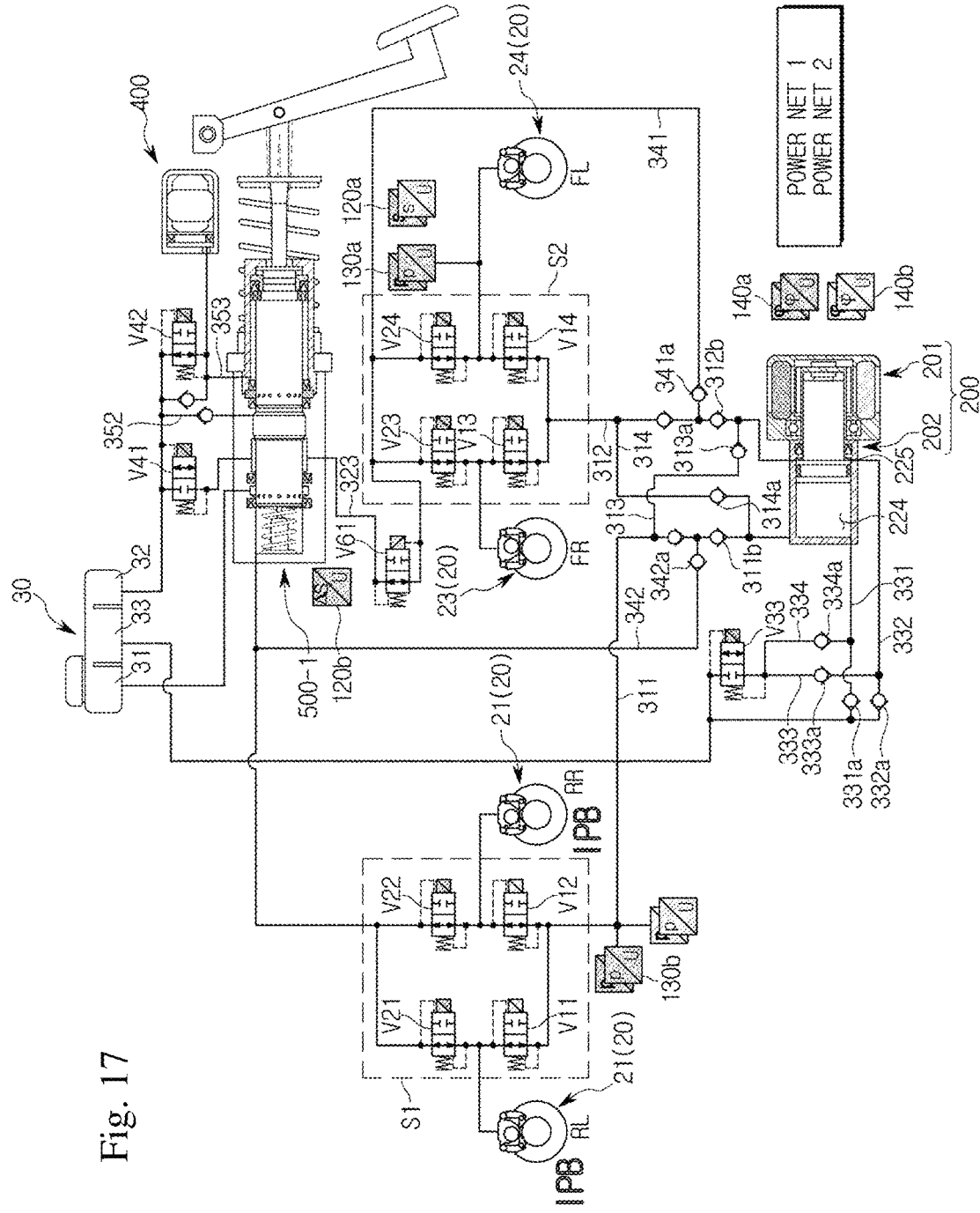
FIG. 17 is a view illustrating a modified example of the electric brake system according to the ninth embodiment.

Referring to FIGS. 16 and 17, according to a ninth embodiment, the electric brake system may be operated in an integrated parking brake (IPB) manner, wherein a wheel brake associated with a parking brake, which are electrically operated, is provided, the wheel brake is connected the first and second power net operating independently of each other, and thus the wheel brake and the parking brake are integrated. The wheel brake connected to the parking brake may be a pair of rear wheels RR and RL.

According to the ninth embodiment, the electric brake system may further include a normally open cylinder valve V61 disposed between the outlet valves V23 and V24 of the second hydraulic circuit S2 connected the pair of front wheels FR and FL, and the cylinder chamber 511.

The third inlet valve V13, the fourth inlet valve V14, the first outlet valve V21, the second outlet valve V22, the third outlet valve V23, the fourth outlet valve V24, the dump valve V31, the first reservoir valve V41 and the second reservoir valve V42 are connected to the first power net. The cylinder valve V61, and the first inlet valves V11 and V12 of the first hydraulic circuit S1 connected to the pair of rear wheels RR and RL, and the parking brake may be connected to the second power net.

Figure 18:
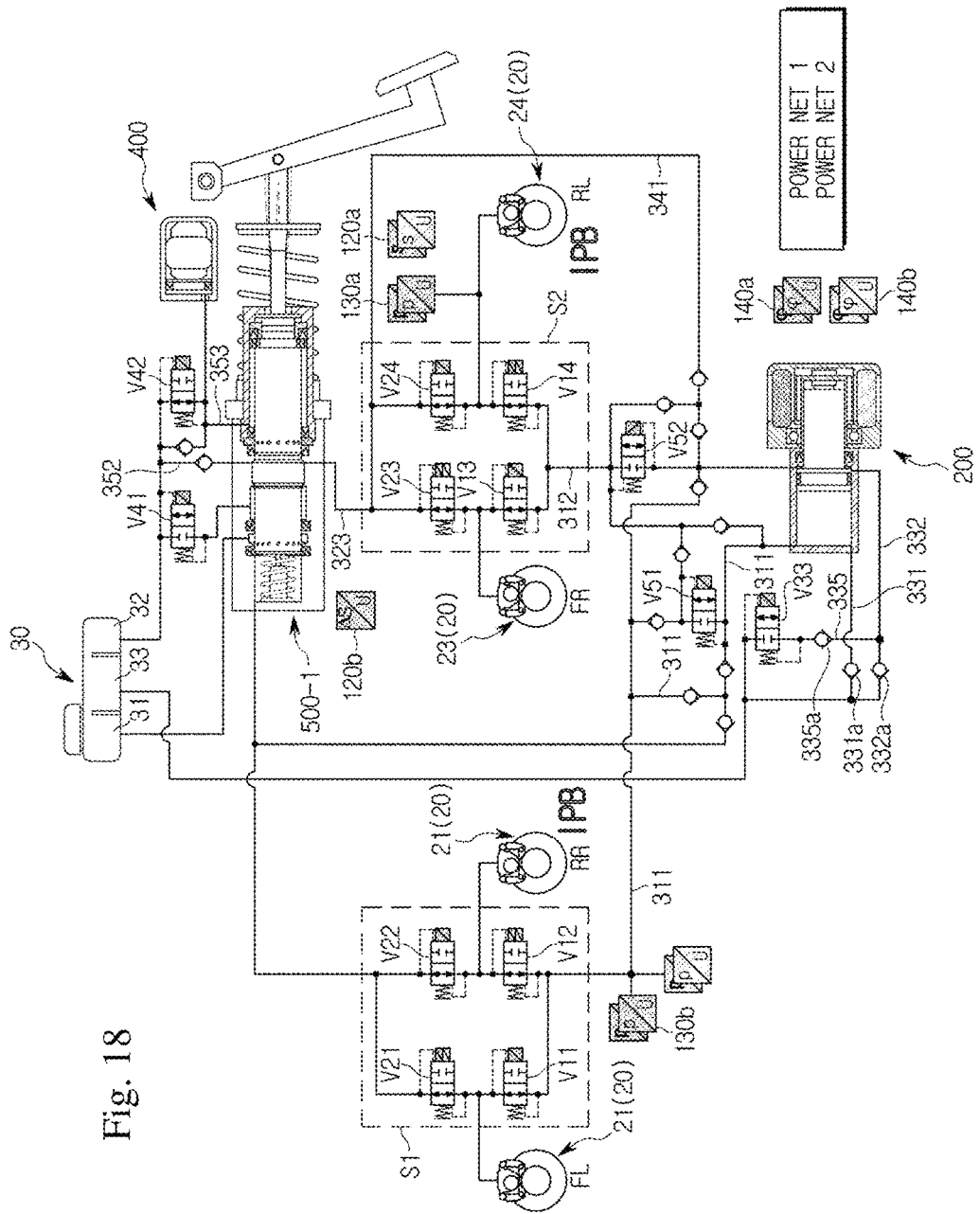
FIG. 18 is a view illustrating an electric brake system according to a tenth embodiment.

Referring to FIG. 18, according a tenth embodiment, an electronic control unit (ECU) includes a first electronic control unit connected to a first power net and a second electronic control unit connected to a second power net, wherein some of the inlet valves V10 or some of the outlet valves V20 may be connected to the second power net. For example, two coils may be wound only on the second inlet valve V12, the fourth inlet valve V14, the first outlet valve V21 and the third outlet valve V23, and thus one coil is connected to the first power network, and the other one of the coil is connected to the second power net.

In this embodiment, at least the general brake function may be activated through the inlet and outlet valves connected to the second power net even when the first power net malfunctions. Accordingly, it may be possible to reduce waste of material and material cost by reducing the number of the valves connected to the second power net.

As is apparent from the above description, the electric brake system is configured to allow the other hydraulic circuit to generate a braking pressure even when any one of the first and second hydraulic circuits is operated abnormally, and thus the electric brake system is stably operated by driving the other hydraulic circuit even when any one hydraulic circuit malfunctions.

In addition, the brake system uses eight normally open inlet valves and outlet valves and thus it may be possible to implement an effective and simplified hydraulic circuit.

Although a few embodiments of the present disclosure have been shown and described, it would be appreciated by those skilled in the art that changes may be made in these embodiments without departing from the principles and spirit of the disclosure, the scope of which is defined in the claims and their equivalents.

| Description of symbols. | |
|---|---|
| 10: pedal | 11: input rod |
| 12: locking protrusion | 20: wheel brake |
| 30: reservoir | 31: first reservoir chamber |
| 32: second reservoir chamber | 33: third reservoir chamber |
| V11: first inlet valve | V12: second inlet valve |
| V13: third inlet valve | V14: fourth inlet valve |
| V21: first outlet valve | V22: second outlet valve |
| V23: third outlet valve | V24: fourth outlet valve |
| V31: first dump valve | V32: second dump valve |
| V33: third dump valve | V41: first reservoir valve |
| V42: second reservoir valve | V51: first control valve |
| V52: second control valve | V61: cylinder valve |
| 100: pedal operator | 111: piston |
| 112: housing | 113: elastic member |
| 114: pedal spring | 120a: pedal displacement sensor |
| 120b: pedal displacement sensor | 130a: circuit hydraulic pressure sensor |
| 130b: circuit hydraulic pressure sensor | 140a: driving displacement sensor |
| 140b: driving displacement sensor | 150: reservoir displacement sensor |
| 200: pressure supplier | 201: driver |
| 202: piston pump unit | 224: first pump chamber |
| 225: second pump chamber | 230: piston |
| 300: braking pressure regulator | 310: inlet line |
| 311: first inlet line | 312: second inlet line |
| 313: third inlet line | 314: fourth inlet line |
| 320: outlet line | 321: first outlet line |
| 322: second outlet line | 323: third outlet line |
| 324: fourth outlet line | 330: pump reservoir line |
| 331: first pump reservoir line | 332: second pump reservoir line |
| 333: third pump reservoir line | 334: fourth pump reservoir line |
| 335: fifth pump reservoir line | 340: cylinder line |
| 341: first cylinder line | 342: second cylinder line |
| 350: reservoir line | 351: first reservoir line |
| 352: second reservoir line | 353: third reservoir line |
| 354: fourth reservoir line | 355: fifth reservoir line |
| 360: connection line | 361: first connection line |
| 362: second connection line | 363: third connection line |
| 400: simulator unit | 410: housing |
| 411: simulator chamber | 412: piston |
| 413: elastic member | 414: sealing member |
| 500: cylinder unit | 511: cylinder chamber |
| 512: first piston | 513: pedal spring |
| 514: first cylinder chamber | 521: pressure chamber |
| 522: pressing member | 531: second cylinder chamber |
| 532: second piston | S1: first hydraulic circuit |
| S2: second hydraulic circuit | |

What is claimed is:

1. An electric brake system comprising:
    a pedal operator connected to a brake pedal and configured to transmit a braking intention to an electronic control unit;
    a reservoir configured to store a working fluid;
    a pressure supplier provided with a driver providing a power, and configured to generate a hydraulic pressure to a plurality of wheel brakes; and
    a braking pressure regulator configured to regulate a hydraulic pressure, which is generated by the pressure supplier and transmitted to the wheel brake, wherein the braking pressure regulator comprises a first hydraulic circuit hydraulically connected to two wheel brakes and a second hydraulic circuit hydraulically connected to other two wheel brakes, wherein the first hydraulic circuit and the second hydraulic circuit are provided with a plurality of inlet lines connecting the pressure supplier to each of the wheel brake, and a plurality of outlet lines connecting each of the wheel brake to the reservoir or connecting each of the wheel brake to the pedal operator, wherein the first hydraulic circuit and the second hydraulic circuit are hydraulically separated from each other to regulate a hydraulic pressure, which is transmitted to the wheel brake by the other hydraulic circuit when any one hydraulic circuit operates abnormally, wherein the plurality of inlet lines comprises a first inlet line provided in the first hydraulic circuit and provided with a first inlet valve, a second inlet line provided in the first hydraulic circuit and provided with a second inlet valve, a third inlet line provided in the second hydraulic circuit and provided with a third inlet valve, and a fourth inlet line provided in the second hydraulic circuit and provided with a fourth inlet valve, wherein the plurality of outlet lines comprises a first outlet line provided in the first hydraulic circuit and provided with a first outlet valve, a second outlet line provided in the first hydraulic circuit and provided with a second outlet valve, a third outlet line provided in the second hydraulic circuit and provided with a third outlet valve, and a fourth outlet line provided in the second hydraulic circuit and provided with a fourth outlet valve, wherein an electrical performance of the first to fourth inlet valves is controlled independent of an electrical performance of the first to fourth outlet valve so as to prevent simultaneous closing caused by malfunctions, wherein the pressure supplier comprises a first piston operated by receiving power, and a pump chamber variable in volume according a displacement of the first piston, and wherein each of the first to fourth inlet lines further comprises a corresponding one of first to fourth check valves provided between the pump chamber and a corresponding one of the inlet valve, and configured to allow only one-way flow from the pump chamber to the inlet valve.

2. The electric brake system of claim 1, wherein the first to fourth inlet valves and the first to fourth outlet valves are an analog normally open valve.

3. The electric brake system of claim 1, wherein the first to fourth inlet valves are connected to two different power nets so that, when any one power net malfunctions, the first to fourth inlet valves are operated by the other power net.

4. The electric brake system of claim 1, wherein the first to fourth outlet valves are connected to two different power nets so that, when any one power net malfunctions, the first to fourth inlet valves are operated by the other power net.

5. The electric brake system of claim 1, wherein the pump chamber comprises
a first pump chamber disposed in front of the first piston and a second pump chamber disposed behind the first piston,
wherein the pump chamber further comprises
a first pump reservoir line configured to connect the first pump chamber to the reservoir and provided with a check valve allowing only one-way flow from the reservoir to the first pump chamber, and
a second pump reservoir line configured to connect the second pump chamber to the reservoir and provided with a check valve allowing only one-way flow from the reservoir to the second pump chamber.

6. The electric brake system of claim 5, further comprising:
a third pump reservoir line configured to connect the first pump chamber to the reservoir and provided with a check valve allowing only one-way flow from the first pump chamber to the reservoir, and a first dump valve; and
a fourth pump reservoir line configured to connect the second pump chamber to the reservoir and provided with a check valve allowing only one-way flow from the second pump chamber to the reservoir, and a second dump valve.

7. The electric brake system of claim 1, wherein the pedal operator comprises
a second piston connected the brake pedal, an elastic member configured to provide a reaction force corresponding to a pedal force of the brake pedal, and a pedal displacement sensor configured to measure a user's braking intention,
wherein the pedal operator is hydraulically separated from the braking pressure regulator.

8. The electric brake system of claim 1, wherein the pedal operator comprises
a cylinder unit provided with a second piston connected to the brake pedal; and a simulator unit hydraulically connected to the cylinder unit to provide a reaction force corresponding to a pedal force of the brake pedal,
wherein the cylinder unit comprises a cylinder chamber variable in volume by the second piston and a pressure chamber variable in volume by a pressing member.

9. The electric brake system of claim 8, wherein the brake pedal and the second piston are connected to each other through an input rod, and the pressing member is movable forward and backward by a locking protrusion provided on the input rod.

10. The electric brake system of claim 9, further comprising:
a first reservoir line configured to connect the reservoir, the pressure chamber and the simulator unit,
wherein the first reservoir line comprises
a first reservoir valve, and a check valve provided in parallel with the first reservoir valve and configured to allow only one way flow from the reservoir to the pressure chamber or only one way flow from the reservoir to the simulator unit.

11. The electric brake system of claim 10, further comprising:
a second reservoir line and a third reservoir line configured to connect the reservoir to the cylinder chamber,
wherein the second reservoir line is provided with a normally closed second reservoir valve, and
the third reservoir line is provided with a check valve configured to allow only one way flow from the reservoir to the cylinder chamber.

12. The electric brake system of claim 11, wherein the pressure supplier comprises
a first piston operated by receiving power; and a pump chamber variable in volume by a displacement of first piston, wherein the pump chamber comprises a first pump chamber disposed in front of the first piston and a second pump chamber disposed behind the first piston,
wherein the pump chamber further comprises
a first pump reservoir line configured to connect the first pump chamber to the reservoir and provided with a check valve allowing only one-way flow from the reservoir to the first pump chamber;
a second pump reservoir line configured to connect the second pump chamber to the reservoir and provided with a check valve allowing only one-way flow from the reservoir to the second pump chamber;
a third pump reservoir line configured to connect the first pump chamber to the reservoir and provided with a check valve allowing only one-way flow from the first pump chamber to the reservoir, and a first dump valve; and
a fourth pump reservoir line configured to connect the second pump chamber to the reservoir and provided with a check valve allowing only one-way flow from the second pump chamber to the reservoir, and a second dump valve.

13. The electric brake system of claim 11, wherein
the first and second outlet lines are connected to the cylinder chamber by joining from each of the wheel brake,
wherein each of the first and second outlet lines is provided with a check valve configured to allow only one-way flow from each of the wheel brake to the cylinder chamber.

14. The electric brake system of claim 13, wherein
the third and fourth outlet lines are connected to the cylinder chamber by joining from each of the wheel brake,
wherein each of the third and fourth outlet lines is provided with a check valve configured to allow only one-way flow from each of the wheel brake to the cylinder chamber.

15. The electric brake system claim 14, wherein
the pressure supplier comprises
a first piston operated by receiving power; and a pump chamber variable in volume by a displacement of first piston,
wherein the pump chamber comprises a first pump chamber disposed in front of the first piston and a second pump chamber disposed behind the first piston,
wherein the pump chamber further comprises
a first pump reservoir line configured to connect the first pump chamber to the reservoir and provided with a check valve allowing only one-way flow from the reservoir to the first pump chamber;
a second pump reservoir line configured to connect the second pump chamber to the reservoir and provided with a check valve allowing only one-way flow from the reservoir to the second pump chamber;
a third pump reservoir line configured to connect the first pump chamber to the reservoir and provided with a check valve allowing only one-way flow from the first pump chamber to the reservoir;
a fourth pump reservoir line configured to connect the second pump chamber to the reservoir and provided with a check valve allowing only one-way flow from the second pump chamber to the reservoir; and
a fifth pump reservoir line connected to the reservoir after the third pump reservoir line and the fourth pump reservoir line join, and provided with a dump valve configured to regulate two-way flow.

16. The electric brake system of claim 11, wherein
the cylinder unit further comprises a third piston configured to divide the cylinder chamber into a first cylinder chamber and a second cylinder chamber,
wherein the second reservoir line connects the reservoir to the first cylinder chamber; and
the third reservoir line connects the reservoir to the second cylinder chamber.

17. The electric brake system of claim 16, further comprising:
a first cylinder line configured to connect the first cylinder chamber to the first hydraulic circuit; and
a second cylinder line configured to connect the second cylinder chamber to the second hydraulic circuit,
wherein the first cylinder line is connected to the first and second inlet lines and provided with a check valve allowing only one-way flow from the first cylinder chamber to the first hydraulic circuit; and
the second cylinder line is connected to the third and fourth inlet lines and provided with a check valve allowing only one-way flow from the second cylinder chamber to the second hydraulic circuit.

18. The electric brake system of claim 11, wherein
the third and fourth outlet lines is connected to the cylinder chamber by joining from each of the wheel brake and provided with a normally open cylinder valve.

19. The electric brake system of claim 1, wherein
the pressure supplier comprises
a first piston operated by receiving power; and a pump chamber variable in volume by a displacement of first piston,
wherein the pump chamber comprises a first pump chamber disposed in front of the first piston and a second pump chamber disposed behind the first piston,
wherein the pump chamber comprises a first inlet line connecting the first pump chamber to the first hydraulic circuit, a second inlet line connecting the second pump chamber to the second hydraulic circuit, a third inlet line connecting the second pump chamber to the first hydraulic circuit, and a fourth inlet line connecting the first pump chamber to the second hydraulic circuit,
wherein the pump chamber further comprises a first connection line configured to connect the first inlet line to the third inlet line and provided with a check valve allowing only one-way flow from the third inlet line to the first inlet line, and a normally closed first control valve; a second connection line configured to connect the fourth inlet line to the first connection line and provided with a check valve allowing only one-way flow from the fourth inlet line to the first connection line; and a third connection line provided in parallel with the second inlet line and provided with a normally closed second control valve.

20. An electric brake system comprising:
a pedal operator connected to a brake pedal and configured to transmit a braking intention to an electronic control unit;
a reservoir configured to store a working fluid;
a pressure supplier provided with a driver providing power, and configured to generate a hydraulic pressure of a plurality of wheel brakes; and
a braking pressure regulator configured to regulate a hydraulic pressure, which is generated by the pressure supplier and transmitted to the wheel brake,
wherein the braking pressure regulator comprises a first hydraulic circuit hydraulically connected to two wheel brakes and a second hydraulic circuit hydraulically connected to other two wheel brakes, wherein the first hydraulic circuit and the second hydraulic circuit are provided with a plurality of inlet lines connecting the pressure supplier to each of the wheel brake, and a plurality of outlet lines connecting each of the wheel brake to the reservoir or connecting each of the wheel brake to the pedal operator, wherein the first hydraulic circuit and the second hydraulic circuit are hydraulically separated from each other to regulate a hydraulic pressure, which is transmitted to the wheel brake by the other hydraulic circuit when any one hydraulic circuit operates abnormally, and wherein the electronic control unit comprises a first electronic control unit connected to a first power net and a second electronic control unit connected to a second power net configured to operate selectively or together with the first power net.

21. The electric brake system of claim 20, wherein the pressure supplier is operated by the second electronic control unit when the first electronic control unit operates abnormally or by the first electronic control unit when the second electronic control unit operates abnormally.

22. An electric brake system comprising:

a pedal operator connected to a brake pedal and configured to transmit a braking intention to an electronic control unit;

a reservoir configured to store a working fluid;

a pressure supplier provided with a driver providing a power, and configured to generate a hydraulic pressure of a plurality of wheel brakes; and a braking pressure regulator configured to regulate a hydraulic pressure, which is generated by the pressure supplier and transmitted to the wheel brake, wherein the braking pressure regulator comprises a first hydraulic circuit hydraulically connected to two wheel brakes and a second hydraulic circuit hydraulically connected to other two wheel brakes, wherein the first hydraulic circuit and the second hydraulic circuit are provided with a plurality of inlet lines connecting the pressure supplier to each of the wheel brake, and a plurality of outlet lines connecting each of the wheel brake to the reservoir or connecting each of the wheel brake to the pedal operator, wherein the first hydraulic circuit and the second hydraulic circuit are hydraulically separated from each other to regulate a hydraulic pressure, which is transmitted to the wheel brake by the other hydraulic circuit when any one hydraulic circuit operates abnormally wherein the electric brake system further comprises:

a pedal displacement sensor configured to detect a displacement of the brake pedal;

a circuit hydraulic pressure sensor configured to detect a hydraulic pressure of the first hydraulic circuit or the second hydraulic circuit; and a driving displacement sensor configured to detect a rotation amount of the driver, wherein the pedal displacement sensor, the hydraulic pressure sensor, and the driving displacement sensor comprise a main sensor and an auxiliary sensor, respectively, wherein the auxiliary sensor is a redundancy sensor configured to be operated when the main sensor operates abnormally.

* * * * *